US012242658B2

(12) United States Patent
Limonta et al.

(10) Patent No.: US 12,242,658 B2
(45) Date of Patent: Mar. 4, 2025

(54) TRUSTED DATA PROVENANCE

(71) Applicant: Nokia Technologies Oy, Espoo (FI)

(72) Inventors: Gabriela Limonta, Espoo (FI); Kiti Muller, Helsinki (FI); Ian Oliver, Soderkulla (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 248 days.

(21) Appl. No.: 17/905,344

(22) PCT Filed: Feb. 18, 2021

(86) PCT No.: PCT/FI2021/050118
§ 371 (c)(1),
(2) Date: Aug. 31, 2022

(87) PCT Pub. No.: WO2021/176134
PCT Pub. Date: Sep. 10, 2021

(65) Prior Publication Data
US 2023/0088697 A1 Mar. 23, 2023

(30) Foreign Application Priority Data
Mar. 3, 2020 (FI) .................................. 20205221

(51) Int. Cl.
*G06F 21/64* (2013.01)
*H04L 9/08* (2006.01)

(52) U.S. Cl.
CPC ............ *G06F 21/64* (2013.01); *H04L 9/0825* (2013.01)

(58) Field of Classification Search
CPC ...... G06F 21/60; G06F 21/602; G06F 21/606; G06F 21/62; H04L 9/08; H04L 9/0816; H04L 9/0825; H04L 9/0827; H04L 9/0841
See application file for complete search history.

(56) References Cited

U.S. PATENT DOCUMENTS 8,468,591 B2 * 6/2013 Silverstone ............. H04L 63/08
8,498,941 B2 * 7/2013 Felsher ............... G06F 21/6245
705/51

(Continued)

FOREIGN PATENT DOCUMENTS

CN 102547680 A 7/2012
EP 3522056 A1 8/2019

(Continued)

OTHER PUBLICATIONS

Mnodha et al., "Secure Data Aggregation Techniques for Wireless Sensor Networks: A Review", Archives of Computational Methods in Engineering, vol. 26, 2019, pp. 1007-1027.

(Continued)

*Primary Examiner* — Hosuk Song
(74) *Attorney, Agent, or Firm* — ALSTON & BIRD LLP

(57) ABSTRACT

According to an example embodiment, a technique for data acquisition is provided, comprising: receiving, from an intermediate apparatus, a trusted aggregate data object comprising aggregate data object that comprises aggregate data comprising a respective trusted source data object for one or more data source apparatuses mapped to the intermediate apparatus and an intermediate apparatus quote that is descriptive of one or more aspects of a configuration of the intermediate apparatus upon production of the aggregate data, and an intermediate apparatus signature comprising a digital signature derived based on the aggregate data object using a first key assigned to the intermediate apparatus; and verifying, based at least in part on information received in the trusted aggregate data object, integrity of data included in the trusted aggregate data object and integrity of the intermediate apparatus.

20 Claims, 10 Drawing Sheets

(56) References Cited

U.S. PATENT DOCUMENTS

| | | | |
|---|---|---|---|
| 9,607,131 B2* | 3/2017 | Winograd | H04L 63/0823 |
| 10,142,111 B2* | 11/2018 | Behm | H04L 63/08 |
| 10,909,249 B2* | 2/2021 | Silverstone | H04L 63/08 |
| 11,722,314 B2* | 8/2023 | Jarjoui | H04L 9/3247 |
| | | | 713/150 |
| 2009/0268914 A1 | 10/2009 | Singh | |
| 2011/0145894 A1 | 6/2011 | Garcia Morchon et al. | |
| 2011/0320823 A1 | 12/2011 | Saroiu et al. | |
| 2012/0289789 A1 | 11/2012 | Jain et al. | |
| 2014/0350883 A1 | 11/2014 | Carter et al. | |
| 2017/0126647 A1 | 5/2017 | Zhang et al. | |
| 2017/0134884 A1 | 5/2017 | Taborn | |
| 2017/0244565 A1 | 8/2017 | Bronk | |
| 2018/0220906 A1 | 8/2018 | LeBoeuf et al. | |
| 2018/0293387 A1 | 10/2018 | Bar-El | |
| 2019/0044726 A1 | 2/2019 | Macieira et al. | |
| 2019/0319808 A1 | 10/2019 | Fallah et al. | |

FOREIGN PATENT DOCUMENTS

| | | |
|---|---|---|
| WO | 2016/048177 A1 | 3/2016 |
| WO | 2018/106475 A1 | 6/2018 |

OTHER PUBLICATIONS

Cui et al., "Data aggregation with end-to-end confidentiality and integrity for large-scale wireless sensor networks", Peer-to-Peer Networking and Applications, vol. 11, 2018, pp. 1022-1037.

Ferng et al., "On security of wireless sensor networks: a data authentication protocol using digital signature", Wireless Networks, vol. 23, 2017, pp. 1113-1131.

Liu et al., "Secure Data Aggregation with Integrity Verification in Wireless Sensor Networks", International Conference on Database Systems for Advanced Applications, 2018, pp. 717-733.

Aman et al., "Low Power Data Integrity in IoT Systems", IEEE Internet of Things Journal, vol. 5, No. 4, Aug. 2018, pp. 3102-3113.

Pohls, "JSON Sensor Signatures (JSS): End-to-End Integrity Protection from Constrained Device to IoT Application", 9th International Conference on Innovative Mobile and Internet Services in Ubiquitous Computing, Jul. 8-10, 2015, 7 pages.

Une, "The Security Evaluation of Time Stamping Schemes: The Present Situation and Studies", IMES Discussion Paper Series 2001-E-18, Dec. 2001, 38 pages.

"Apr. 20, 2017: Trusted Timestamping of Mementos", Web Science and Digital Libraries Research Group, Retrieved on Sep. 13, 2022, Webpage available at : https://ws-dl.blogspot.com/2017/04/2017-04-20-trusted-timestamping-of.html.

Gipp et al., "Decentralized Trusted Timestamping using the Crypto Currency Bitcoin", Proceedings of the iConference, Mar. 2015, pp. 1-5.

Gipp et al., "Securing Video Integrity Using Decentralized Trusted Timestamping on the Blockchain", Tenth Mediterranean Conference on Information Systems (MCIS), Sep. 2016, pp. 1-10.

Breitinger et al., "VirtualPatent-Enabling the Traceability of Ideas Shared Online using Decentralized Trusted Timestamping", Proceedings of the 15th International Symposium of Information Science, 2017, 7 pages.

Adams et al., "Internet X.509 Public Key Infrastructure Time-Stamp Protocol (TSP)", RFC 3161, Network Working Group, Aug. 2001, pp. 1-22.

Pinkas et al., "Policy Requirements for Time-Stamping Authorities (TSAs)", RFC 3628, Network Working Group, Nov. 2003, pp. 1-43.

"Electronic Signatures and Infrastructures (ESI); Time stamping profile", ETSI TS 101 861, V1.4.1, Jul. 2011, pp. 1-11.

"Electronic Signatures and Infrastructures (ESI); Policy requirements for time-stamping authorities", ETSI TS 102 023, V1.2.2, Oct. 2008, pp. 1-33.

Russell, "Analysis of a Secure Time Stamp Device", SANS Institute, Oct. 17, 2001, 18 pages.

Zou, "Implementation of TSP Protocol", CMSC 681 Project Report, 2000, pp. 1-11.

Yussoff et al., "Lightweight Trusted Authentication Protocol for Wireless Sensor Network (WSN)", International Journal of Communications, vol. 2, 2017, pp. 130-136.

Ahmed et al., "Integration of Wireless Sensor Network with Medical Service Provider for Ubiquitous e-Healthcare", High Capacity Optical Networks and Emerging/Enabling Technologies, Dec. 12-14, 2012, pp. 120-126.

"FDA Approves Pill with Sensor That Digitally Tracks if Patients Have Ingested Their Medication", Physician's Weekly, Retrieved on Sep. 13, 2022, Webpage available at : https://www.physiciansweekly.com/fda-approves-pill-with-sensor-that-digitally-tracks-if-patients-have-ingested-their-medication.

"Remote ATtestation ProcedureS (rats)", Datatracker, Retrieved on Sep. 13, 2022, Webpage available at : https://datatracker.ietf.org/wg/rats/about/.

Tan et al., "A TPM-enabled Remote Attestation Protocol (TRAP) in Wireless Sensor Networks", Proceedings of the 6th ACM workshop on Performance monitoring and measurement of heterogeneous wireless and wired networks, Oct. 2011, pp. 9-16.

Furtak et al., "A Framework for Constructing a Secure Domain of Sensor Nodes", Sensors, vol. 19, No. 12, 2019, pp. 1-30.

Furtak et al., "Securing transmissions between nodes of WSN using TPM", Federated Conference on Computer Science and Information Systems (FedCSIS), vol. 5, Sep. 13-16, 2015, pp. 1059-1068.

Liu et al., "Software Abstractions for Trusted Sensors", Proceedings of the 10th international conference on Mobile systems, applications, and services, Jun. 2012, pp. 365-378.

"IEEE 802.11", Wikipedia, Retrieved on Sep. 13, 2022, Webpage available at : https://en.wikipedia.org/wiki/IEEE_802.11.

"IEEE 802.15.4", Wikipedia, Retrieved on Sep. 13, 2022, Webpage available at : https://en.wikipedia.org/wiki/IEEE_802.15.4.

Office action received for corresponding Finnish Patent Application No. 20205221, dated Jun. 23, 2020, 8 pages.

Paul et al., "Fog Computing-Based IoT for Health Monitoring System", Hindawi, Journal of Sensors, vol. 2018, 2018, pp. 1-7.

Office action received for corresponding Finnish Patent Application No. 20205221, dated Dec. 15, 2020, 6 pages.

International Search Report and Written Opinion received for corresponding Patent Cooperation Treaty Application No. PCT/FI2021/050118, dated May 24, 2021, 14 pages.

Office action received for corresponding Finnish Patent Application No. 20205221, dated Oct. 21, 2021, 4 pages.

Extended European Search Report received for corresponding European Patent Application No. 21764851.8, dated Feb. 12, 2024, 7 pages.

* cited by examiner

700

```
┌─────────────────────────────────────────────────────────────┐
│ Acquire, in an apparatus, data for transmission to another  │
│                         apparatus                           │
│                            702                              │
└─────────────────────────────────────────────────────────────┘
                              │
                              ▼
┌─────────────────────────────────────────────────────────────┐
│  Derive a quote that is descriptive one or more aspects of a│
│  configuration of the apparatus upon production of said     │
│                       acquired data                         │
│                            704                              │
└─────────────────────────────────────────────────────────────┘
                              │
                              ▼
┌─────────────────────────────────────────────────────────────┐
│ Arrange said acquired data and said quote as a data object  │
│          for transmission to said another apparatus         │
│                            706                              │
└─────────────────────────────────────────────────────────────┘
                              │
                              ▼
┌─────────────────────────────────────────────────────────────┐
│ Derive, based on said data object, a digital signature using│
│              a first key assigned to the apparatus          │
│                            708                              │
└─────────────────────────────────────────────────────────────┘
                              │
                              ▼
┌─────────────────────────────────────────────────────────────┐
│ Transmit the data object and the digital signature to said  │
│                       another apparatus                     │
│                            710                              │
└─────────────────────────────────────────────────────────────┘
```

Receive, from an intermediate apparatus, a trusted aggregate data object comprising an aggregate data object and an intermediate apparatus signature, wherein

- the aggregate data object comprises aggregate data comprising a respective trusted source data object for one or more data source apparatuses mapped to the intermediate apparatus and an intermediate apparatus quote that is descriptive of one or more aspects of a configuration of the intermediate apparatus upon production of the aggregate data, and

- the intermediate apparatus signature comprises a digital signature derived based on the aggregate data object using a first key assigned to the intermediate apparatus

802

Verify, based at least in part on information received in the trusted aggregate data object, integrity of data included in the trusted aggregate data object and integrity of the intermediate apparatus

TRUSTED DATA PROVENANCE

RELATED APPLICATION

This application was originally filed as PCT Application No. PCT/FI2021/050118, filed on Feb. 18, 2021, which claims priority from Finnish Application No. 20205221, filed on Mar. 3, 2020, each of which is incorporated herein by reference in its entirety.

TECHNICAL FIELD

The example and non-limiting embodiments of the present invention relate to a data acquisition system that involves trusted provision of data from a data source to a server device via one or more intermediate devices.

BACKGROUND

Computing systems such as cloud environments that store and process data originating from a large number of source devices connected thereto are becoming increasing common. An example of such computing system involves a core processing system (e.g. a cloud computing environment) connected to a plurality of edge processing systems (e.g. a respective edge server), which in turn are each connected to a plurality of devices serving as data sources. A particular example in this regard involves a large amount of Internet of Things (IoT) devices such as sensor devices that are each coupled to a respective one of a plurality of edge servers, which in turn are each coupled to a cloud server. Therein, the IoT devices generate a large amount of data that processed in the edge servers and in the cloud server.

With the increasing size of such computing systems (in terms of the number of data source devices such as sensor devices or IoT devices of other type), security aspects such as trustworthiness and provenance of data received from the source devices in the respective edge server and/or those of data received from the edge servers in the cloud server become an increasingly important issue: in many usage scenarios it is important if not even crucial to ensure that a data source device that generates the data has not been tampered with and/or that the identity of the data source device really is the one assumed by other components of the computing system. In other words, it may be important to verify that the identity of the data sources device from which data is received is the one expected and that the data source device has been operating in an expected manner while generating and providing the data. Depending on the usage environment and purpose of the computing system, tampering with a data source device and/or using another device to impersonate a data source device of the computing system with a malicious intent may result in various levels of inconvenience, harm or damage: while the trustworthiness and provenance of the data is important in all usage scenarios, for example in industrial or medical usage environments tampering with a data source device of a computing system and/or with the data provided therefrom may result serious consequences, including injuries or even death.

SUMMARY

According to an example embodiment, a method is provided, the method comprising: receiving, from an intermediate apparatus, a trusted aggregate data object comprising aggregate data object that comprises aggregate data comprising a respective trusted source data object for one or more data source apparatuses mapped to the intermediate apparatus and an intermediate apparatus quote that is descriptive of one or more aspects of a configuration of the intermediate apparatus upon production of the aggregate data, and an intermediate apparatus signature comprising a digital signature derived based on the aggregate data object using a first key assigned to the intermediate apparatus; and verifying, based at least in part on information received in the trusted aggregate data object, integrity of data included in the trusted aggregate data object and integrity of the intermediate apparatus.

According to another example embodiment a method is provided, the method comprising: acquiring data for transmission to another apparatus; deriving a quote that is descriptive one or more aspects of a configuration of the apparatus upon production of said acquired data; arranging said acquired data and said quote as a data object for transmission to said another apparatus; deriving, based on said data object, a digital signature using a first key assigned to the apparatus; and transmitting said data object and said digital signature to said another apparatus.

According to another example embodiment, an apparatus is provided, the apparatus configured to: receive, from an intermediate apparatus, a trusted aggregate data object comprising aggregate data object that comprises aggregate data comprising a respective trusted source data object for one or more data source apparatuses mapped to the intermediate apparatus and an intermediate apparatus quote that is descriptive of one or more aspects of a configuration of the intermediate apparatus upon production of the aggregate data, and an intermediate apparatus signature comprising a digital signature derived based on the aggregate data object using a first key assigned to the intermediate apparatus; and verify, based at least in part on information received in the trusted aggregate data object, integrity of data included in the trusted aggregate data object and integrity of the intermediate apparatus.

According to another example embodiment, an apparatus is provided, the apparatus configured to: acquire data for transmission to another apparatus; derive a quote that is descriptive one or more aspects of a configuration of the apparatus upon production of said acquired data; arrange said acquired data and said quote as a data object for transmission to said another apparatus; derive, based on said data object, a digital signature using a first key assigned to the apparatus; and transmit said data object and said digital signature to said another apparatus.

According to another example embodiment, an apparatus is provided, the apparatus comprising: means for receiving, from an intermediate apparatus, a trusted aggregate data object comprising aggregate data object that comprises aggregate data comprising a respective trusted source data object for one or more data source apparatuses mapped to the intermediate apparatus and an intermediate apparatus quote that is descriptive of one or more aspects of a configuration of the intermediate apparatus upon production of the aggregate data, and an intermediate apparatus signature comprising a digital signature derived based on the aggregate data object using a first key assigned to the intermediate apparatus; and means for verifying, based at least in part on information received in the trusted aggregate data object, integrity of data included in the trusted aggregate data object and integrity of the intermediate apparatus.

According to another example embodiment, an apparatus is provided, the apparatus comprising: means for acquiring data for transmission to another apparatus; means for deriving a quote that is descriptive one or more aspects of a configuration of the apparatus upon production of said acquired data; means for arranging said acquired data and said quote as a data object for transmission to said another apparatus; means for deriving, based on said data object, a digital signature using a first key assigned to the apparatus; and means for transmitting said data object and said digital signature to said another apparatus.

According to another example embodiment, an apparatus is provided, wherein the apparatus comprises at least one processor; and at least one memory including computer program code, which, when executed by the at least one processor, causes the apparatus to: receive, from an intermediate apparatus, a trusted aggregate data object comprising aggregate data object that comprises aggregate data comprising a respective trusted source data object for one or more data source apparatuses mapped to the intermediate apparatus and an intermediate apparatus quote that is descriptive of one or more aspects of a configuration of the intermediate apparatus upon production of the aggregate data, and an intermediate apparatus signature comprising a digital signature derived based on the aggregate data object using a first key assigned to the intermediate apparatus; and verify, based at least in part on information received in the trusted aggregate data object, integrity of data included in the trusted aggregate data object and integrity of the intermediate apparatus.

According to another example embodiment, an apparatus is provided, wherein the apparatus comprises at least one processor; and at least one memory including computer program code, which, when executed by the at least one processor, causes the apparatus to: acquire data for transmission to another apparatus; derive a quote that is descriptive one or more aspects of a configuration of the apparatus upon production of said acquired data; arrange said acquired data and said quote as a data object for transmission to said another apparatus; derive, based on said data object, a digital signature using a first key assigned to the apparatus; and transmit said data object and said digital signature to said another apparatus.

According to another example embodiment, a computer program is provided, the computer program comprising computer readable program code configured to cause performing at least a method according to an example embodiment described in the foregoing when said program code is executed on a computing apparatus.

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings. The examples and features, if any, described in this specification that do not fall under the scope of the independent claims are to be interpreted as examples useful for understanding various embodiments of the invention

BRIEF DESCRIPTION OF FIGURES

The embodiments of the invention are illustrated by way of example, and not by way of limitation, in the figures of the accompanying drawings, where

FIG. 11 illustrates a flowchart depicting a method according to an example;

FIG. 12 illustrates a flowchart depicting a method according to an example.

DESCRIPTION OF SOME EMBODIMENTS

Figures 1, 3, 4A, 4B:
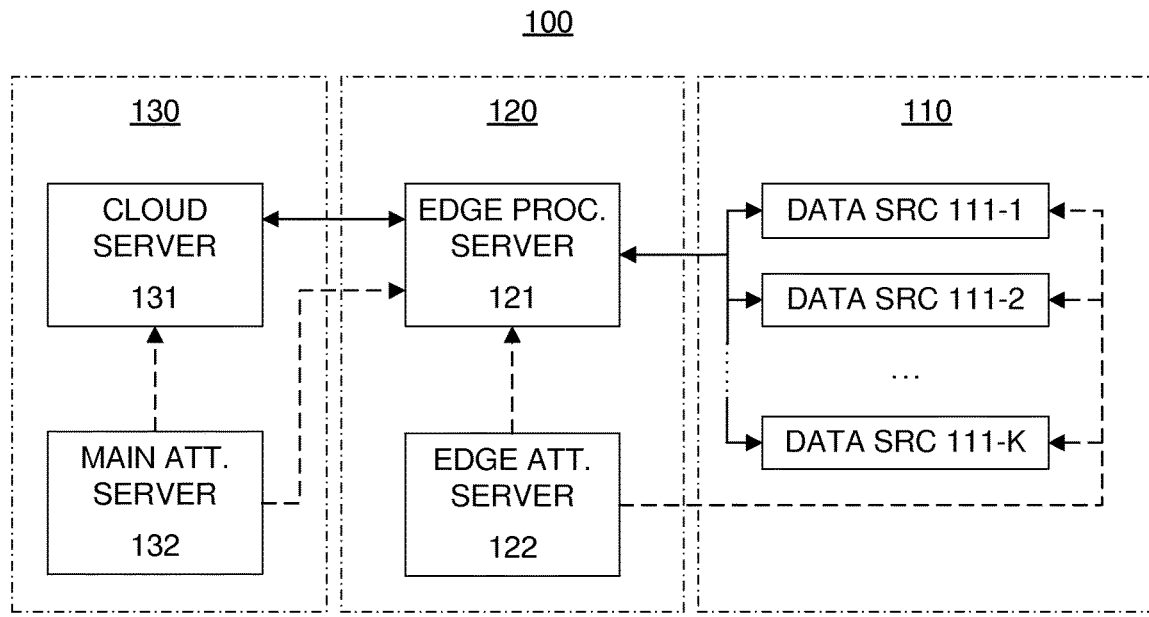
FIG. 1 illustrates a block diagram of some components and/or entities of a data acquisition system according to an example.
FIG. 3 schematically illustrates content of a trusted source data object according to an example.
FIG. 4A schematically illustrates content of an aggregate data object according to an example.
FIG. 4B schematically illustrates content of a trusted aggregate data object according to an example.

FIG. 1 illustrates a block diagram of some components and/or entities of a data acquisition system 100 according to an example. The data acquisition system 100 comprises data source apparatuses 111-1, 111-2, each communicatively coupled to an edge processing server 121, which is further communicatively coupled to a cloud server 131. The data source apparatuses 111-1, 111-2, . . . , 111-K are arranged to capture and/or otherwise generate data and transmit the respective data to the edge processing server 121. The data provided from the data source apparatuses 111-1, 111-2, . . . , 111-K may be referred to as source data. The edge processing server 121 is communicatively coupled to a cloud server 131 and it is configured to arrange and/or process the respective source data received from the data source apparatuses 111-1, 111-2, . . . , 111-K into aggregate data and to transmit the aggregate data to the cloud server 131. The cloud server 131 is arranged to store the aggregate data received from the edge processing server 121 and/or to apply further processing to the aggregate data received from the edge processing server 121.

The data source apparatuses 111-1, 111-2, . . . , 111-K represent one or more data source apparatuses 111 arranged to provide respective source data to the edge processing server 121, where an individual data source apparatus may be referred to as a data source apparatus 111-*k*. Conversely, the edge processing server 121 is arranged to acquire respective source data from the one or more data source apparatuses 111. In this regard, the edge processing server 121 may be provided with information that specifies the one or more data source apparatuses 111 mapped thereto, i.e. the one or more data source apparatuses 111 whose source data is to be provided to the cloud server 131 via the edge processing server 121. Hence, the edge processing server 121 is arranged to serve as an intermediate entity between the data source apparatus 111-*k* and the cloud server 131, e.g. as an entity that collects and possibly also processes respective source data obtained from the one or more data source apparatuses 111 and provides this data further to the cloud server 131 for storage and further processing therein. Therefore, the edge processing server 121 may be, alternatively, referred to as an intermediate server or as an intermediate apparatus.

The edge processing server 121 as described herein is a logical entity that may be implemented by respective one or more computer devices. In other words, references to the edge processing server 121 in the foregoing and in the following refer to an edge processing server functionality provided via the respective one or more computer devices. Along similar lines, the cloud server 131 is likewise a logical entity, which may be implemented by respective one or more computer devices and, consequently, references to the cloud server 131 in the foregoing and in the following refer to a cloud server functionality provided via the respective one or more computer devices Although shown in the illustration of FIG. 1 with the single edge processing server 121, the data acquisition system 100 may comprise one or more edge processing servers, each communicatively coupled to respective one or more data source apparatuses and configured to arrange and/or process respective source data received from the one or more data source apparatuses coupled thereto into respective aggregate data and to provide the aggregate data to the cloud server 131 for further processing and/or storage therein. Hence, each edge processing server has a respective set of one more data source apparatuses mapped thereto and is responsible for providing the respective source data provided by the one or more data source apparatuses mapped thereto to the cloud server 131 via the edge processing server 121. In the following, for clarity and brevity of description, various aspects pertaining to the data acquisition system 100 are described with references to the single edge processing server 121 arranged to receive respective source data from the one or more data source apparatuses 111, whereas the description readily generalizes into an arrangement that comprises a plurality of edge processing servers, each receiving respective source data from respective one or more data source apparatuses.

The data acquisition system 100 further comprises or is coupled to an edge attestation server 122 arranged to monitor trustworthiness of the one or more data source apparatuses 111 and the trustworthiness of the edge processing server 121, and a main attestation server 132 arranged to monitor trustworthiness of the edge processing server 121 and the trustworthiness of the cloud server 131. In this regard, the monitoring may comprise a respective monitoring of trustworthiness of hardware, software and/or firmware of the monitored entity via a predefined remote attestation procedure. The monitoring may comprise a monitoring entity (e.g. one of the edge attestation server 122, the main attestation server 132) and a monitored entity (e.g. one of the data source apparatus 111-*k*, the edge processing server 121, the cloud server 131) implementing a remote attestation procedure. The remote attestation procedure between a given pair of a monitoring entity and a monitored entity may be carried out e.g. in response to a request and/or according to a respective predefined time schedule, e.g. periodically at respective predefined time intervals. A dedicated (and different) time schedule may be defined for each pair of a monitoring entity and a monitored entity.

The remote attestation procedure may be provided using any applicable remote attestation technique known in the art. According to a non-limiting example, the remote attestation procedure applied for a given pair of a monitoring entity and a monitored entity may define the manner of interaction between the monitoring entity and the monitored entity, where the remote attestation procedure may involve operating a monitoring agent in the monitored entity under control of the monitoring entity, which monitoring agent may be arranged to carry out predefined measurements or otherwise obtain information concerning one or more monitored aspects of the monitored entity and communicate the measurement result to the monitoring entity. The monitoring entity may store a reference measurement result pertaining to the monitored entity, which reference measurement value may comprise an initial measurement value derived upon installation or configuration of the monitored entity when it has been operated in a trusted state. Consequently, the monitoring entity may carry out attestation via comparison of a subsequent measurement result to the reference measurement result. The monitoring entity may further store a history of measurement results received from the monitored entity and/or a history of attestation results to enable subsequent verification and tracking of the measurements carried out on the monitored entity and/or the attestation procedures carried out to the monitored entity.

As an example of the measurement result, the measurement result may be descriptive of one or more aspects of configuration of the hardware, software and/or firmware applied by the monitored entity. As an example, the measurement result may be formulated as a quote pertaining to the monitored entity, which may be denoted as quote, whereas the reference measurement result may comprise a respective reference quote $quote_{ref}$ derived upon installation or configuration of the monitored entity. In context of the present disclosure, the quote may comprise or may be provided as, for example, a trusted platform module (TPM) quote or a quote of another type derived using a technique known in the art. In context of such an example, the attestation may comprise comparison of a subsequently obtained quote (quote) to the reference quote ($quote_{ref}$): in case the subsequently obtained quote matches the reference quote (e.g. $quote=quote_{ref}$), the attestation is successful, whereas in case the subsequently obtained quote and the reference quote do not match (e.g. $quote \neq quote_{ref}$), the attestation is unsuccessful. A more detailed example concerning a remote attestation procedure in the framework of the data acquisition system 100 and derivation of the quote(s) therein is provided later in this text.

According to a non-limiting example, aspects related to hardware that may be taken into account in measurements carried out in formation of the quote for a certain apparatus may comprise information about devices connected to the certain apparatus, such as network interfaces, hard disks, external storage devices, etc. According to a non-limiting example, aspects related to firmware that may be taken into account in measurements carried out in formation of the quote for a certain apparatus may comprise firmware source code and/or firmware configuration, wherein the firmware configuration may define, for example, one or more of the following: boot order, secure boot key(s), firmware of devices connected to the certain apparatus, etc. According to a non-limiting example, aspects related to software that may be taken into account in measurements carried out in formation of the quote for a certain apparatus may comprise operating system kernel code and configuration and/or content of static parts of the filesystem in the certain apparatus (e.g. respective content of files that are not expected to change during the lifecycle of the certain apparatus, such as configuration files).

The measurements that serve as basis for forming the quote pertaining to a certain apparatus may comprise measurements carried out during boot time and/or during run time of the certain apparatus. As described in the foregoing, the measurements may concern aspects related to hardware, firmware and/or software of the certain apparatus. Respective results of measurements carried out during boot time and/or during run time may be stored in a secure storage in the certain apparatus, such as platform configuration registers (PCRs) of the TPM provided in the certain apparatus for subsequent formation of the quote. Consequently, when the quote is formed, the measurement results available in the secure storage in the certain apparatus may be complemented with further pieces of relevant information, such as respective indications of firmware version, reboot counters, clock at the certain device, etc.

Along the lines described in the foregoing for the edge processing server 121 and for the cloud server 131, each of the edge attestation server 122 and the main attestation server 132 is described herein as a logical entity that may be implemented by respective one or more computer devices. In other words, references to the respective one of the edge attestation server 122 or to the main attestation server 132 in the foregoing and in the following refer to an edge attestation server functionality or to a main attestation server functionality, respectively. Moreover, in a variation of the above-described data acquisition system 100 the respective functionalities described in the foregoing and in the following for the edge attestation server 122 and the main attestation server 132 may be provided by a single attestation server. In other words, the single logical entity, implemented by respective one or more computer devices, may be provided for monitoring the trustworthiness of the one or more data source apparatuses 111, the trustworthiness of the edge processing server 121 and the trustworthiness of the cloud server 131. In such a variation, the single attestation server may, conceptually, belong to the intermediate layer 120 or to the core layer 130, depending on requirements of a specific implementation of such a variation of the data acquisition system 100.

The data acquisition system 100, at least conceptually, implements a data acquisition system architecture that comprises three portions, sub-systems or layers: a data source layer 110 comprising the data source apparatuses 111, an intermediate layer 120 (e.g. an edge layer) comprising the edge server 121 and the edge attestation server 122, and a core layer 130 comprising the cloud server 131 and the main attestation server 132.

Figure 2:
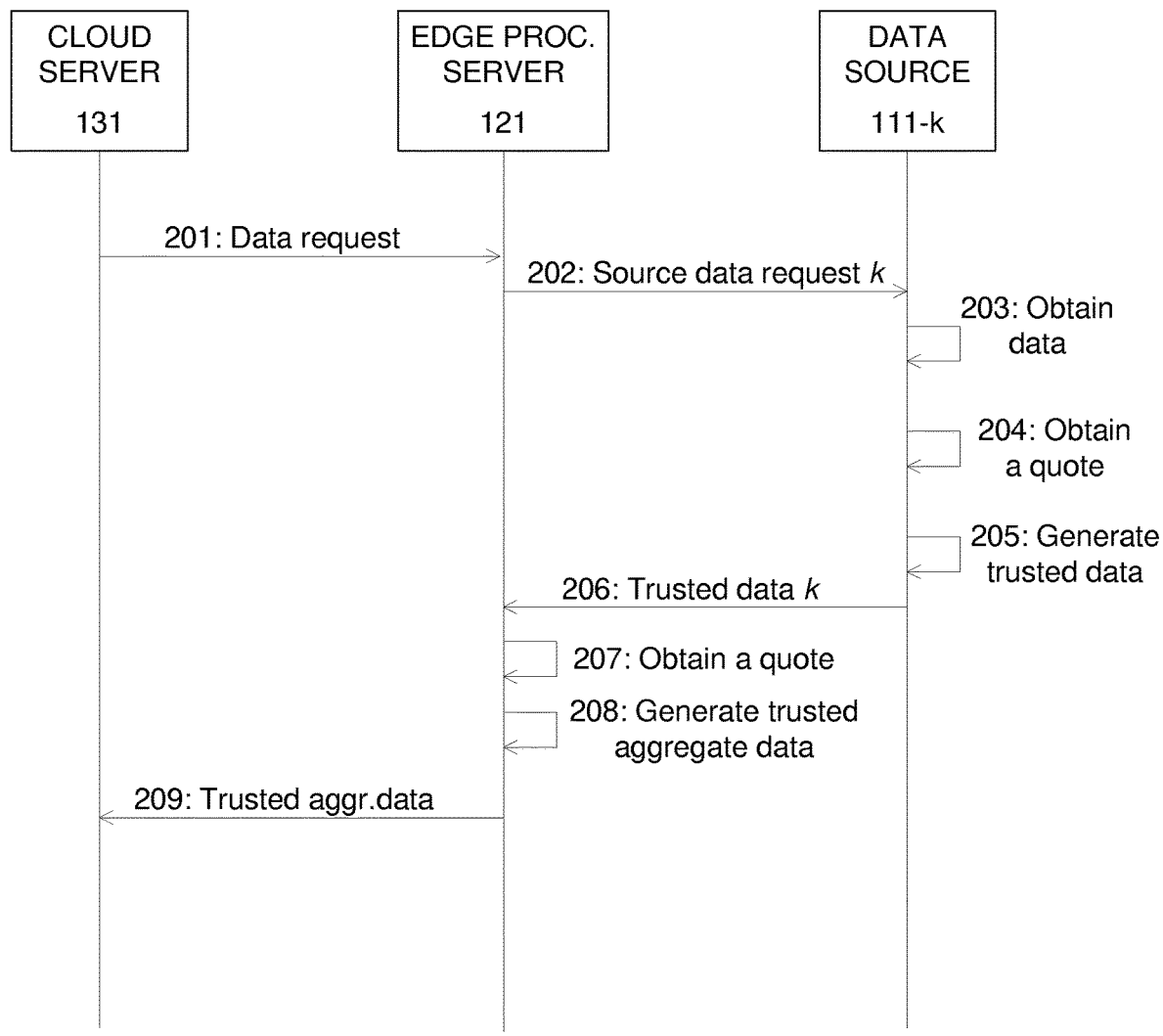
FIG. 2 illustrates some aspects of a data acquisition procedure according to an example.

FIG. 2 illustrates some aspects of a data acquisition procedure in the data acquisition system 100 according to an example. The exemplifying data acquisition procedure shown in FIG. 2 proceeds from the cloud server 131 sending a data request to the edge processing server 121, as indicated in step 201. As an example, the data request may be triggered, for example, in response to a user request received at the cloud server 131, whereas in another examples the cloud server 131 may be arranged to send the data request in response to an occurrence of a predefined triggering condition at or in relation to the cloud server 131 and/or according to a predefined schedule applied at the cloud server 131, e.g. at regular time intervals.

The edge processing server 121 is arranged to, in response to the data request received from the cloud server 131, acquire respective source data from the one or more data source apparatuses 111 mapped thereto. As an example in this regard, FIG. 2 illustrates the edge processing server sending a source data request to the data source apparatus 111-$k$, as indicated in step 202, and receiving a trusted source data object from the data source apparatus 111-$k$, as indicated in step 206. In response to receiving the data request from the edge processing server 121 the data source apparatus 111-$k$ may generate the trusted source data object via a data acquisition procedure that may comprise the following steps:

Obtaining the source data (step 203) at the source device 111-$k$;
Obtaining a quote pertaining to the data source apparatus 111-$k$ (step 204);
Generating a digital signature based on the source data and the quote (step 205).

In this regard, the source data obtained by the data source apparatus 111-$k$ may be denoted as data$_k$, whereas the exact manner of obtaining the source data depends on the type of the data source apparatus 111-$k$. In an example, the source data may be read from a memory provided in or otherwise accessible by the data source apparatus 111-$k$. In another example, the data source apparatus 111-$k$ may comprise or may be provided as a sensor device that comprises one or more sensors and, consequently, the source data obtained at the data source apparatus 111-$k$ may comprise respective sensor information acquired by the data source apparatus 111-$k$ reading the one or more sensors provided therein.

As a non-limiting example, the data source apparatus 111-$k$ may comprise a sensor device including one or more sensors arranged to observe an environmental parameter or another aspect of an environment at the location of the data source apparatus 111-$k$, such as an ambient temperature, an amount of radiation (such as light), a $CO_2$ level, a VOC level, air pressure, humidity, etc. while in another example the one or more sensors provided observing an aspect of an environment may comprise a microphone or an image sensor. In another example, the data source apparatus 111-$k$ may comprise a sensor device including one or more sensors arranged to observe characteristics of a technical process and/or device, such as speed, acceleration, pressure, temperature, direction of movement, a position or orientation, an electric potential (e.g. voltage), an electric current, etc. In a further example, the data source apparatus 111-$k$ may comprise a sensor device including one or more sensors arranged to observe one or more behavioral, physiological and/or biophysiological characteristics of a human or animal. Non-limiting examples of such characteristics include the following: body temperature, blood flow (such as pulse plethysmography), heart rate, breathing, gastro intestinal track mobility, muscle tension, glucose level, oxygen saturation, an electrocardiogram (ECG), an electroencephalogram (EEG), brain evoked response(s) to sensory stimuli (ERP), an electrooculogram (EOG), an electronystagmogram (ENG), an electroneuromyogram (ENMG), a magnetoencephalogram (MEG), an aspect of movement of the human or animal, etc.

The aspect of obtaining the quote pertaining to the data source apparatus 111-k (step 204) may comprise the data source apparatus 111-k measuring one or more aspects of its configuration and formulating the measurement result into the respective quote, which may be denoted as $quote_k$. The quote ($quote_k$) pertaining to the data source apparatus 111-k may be referred to as a respective data source quote. The measurement may comprise a procedure that captures a result that is descriptive of one or more aspects of hardware, software and/or firmware applied in the data source apparatus 111-k upon acquiring the source data. Along the lines described in the foregoing, the data source quote may comprise, for example, a respective TPM quote or another quote derived using a technique known in the art.

Although the illustration of FIG. 2 describes the aspect of obtaining the source data (step 203) at the data source apparatus 111-k as one that precedes the aspect of obtaining the data source quote ($quote_k$) pertaining to the data source apparatus 111-k (step 204), in other examples the data source apparatus 111-k may first obtain the data source quote and then obtain the respective source data or obtain the data source quote and the respective source data at least partially in parallel.

The aspect of generating the digital signature (step 205) in the data source apparatus 111-k may comprise combining or bundling the source data ($data_k$) and the quote ($quote_k$) into a source data object, denoted as $data\_obj_k$, and applying a key assigned to the data source apparatus 111-k to the source data object to derive a digital signature pertaining to the source data object obtained at the source device 111-k. Herein, without losing generality, the source data object may be alternatively referred to as a source data bundle or as a source data blob, where the term blob may serve as an acronym for a binary large object. The digital signature may be denoted as $sig_k$ and it may serve to enable subsequent verification of authenticity and/or integrity of the source data object ($data\_obj_k$). The key applied for deriving the data source signature ($sig_k$) may be denoted as $key_k$ and it may comprise a unique key assigned to the data source apparatus 111-k. The key ($key_k$) applied in derivation of the data source signature ($sig_k$) may comprise a private key of a predefined public key cryptography scheme, which may be e.g. an attestation key obtained from a TPM entity in the data source apparatus 111-k.

The data source apparatus 111-k may further arrange the source data object ($data\_obj_k$) and the data source signature ($sig_k$) into a trusted source data object and transmit the trusted source data object to the edge processing server 121, as indicated in bloc 206. FIG. 3 schematically illustrates content of the trusted source data object according to an example.

The trusted source data object transmitted from the data source apparatus 111-k to the edge processing server 121 may further comprise a device identifier (device ID) assigned for the data source apparatus 111-k or the trusted source data object may be otherwise transmitted together with the device ID assigned to the data source apparatus 111-k to identify the source data included the trusted source data object as one originating from the data source apparatus 111-k.

Along similar lines, the trusted source data object transmitted from the data source apparatus 111-k to the edge processing server 121 may further comprise a timestamp indicating the time of obtaining the respective source data at the data source apparatus 111-k or the trusted source data object may be otherwise transmitted together with the timestamp. Such a timestamp may be received as a source timestamp. In this regard, the source timestamp associated with a certain trusted source data object serves to indicate temporal relationship of the source data included in the certain trusted source data object originating from the data source apparatus 111-k to respective source data included in other (earlier or later) trusted source data objects transmitted from the data source apparatus 111-k and/or to respective source data included in trusted source data objects transmitted from other ones of the one or more data source apparatuses 111. In another example, instead of receiving the source timestamps from respective the data source apparatuses 111-k, the edge processing server may complement or otherwise associate the trusted source data object received from the data source apparatus 111-k with a source timestamp that indicates the time of reception of the respective trusted source data object (and hence the source data included therein) at the edge processing server 121.

Still referring to the source data acquisition from the one or more data source devices 111 mapped to the edge processing server 121, the edge processing server 121 may further respond to the data request received from the cloud server 131 (cf. step 201) by sending a respective source data requests for each of the one or more data source apparatuses 111 mapped thereto to receive the respective trusted source data objects therefrom, thereby repeating the steps 202 to 206 of FIG. 2 for each of the one or more data source apparatuses 111 mapped to the edge processing server 121. In another example, the data request (step 201) that results in the source data request for the one or more data source apparatuses 111 may not be received from or via the cloud server 131 but transmission of the source data requests may be triggered by or via the edge processing server 121, e.g. in response to a user request received at the edge processing server 121, in response to an occurrence of a predefined triggering condition at or in relation to the edge processing server 121 and/or according to a predefined schedule applied at the edge processing server 121, e.g. at regular time intervals.

Before proceeding into forwarding the respective trusted source data objects received from the one or more data source apparatuses 111 mapped thereto to the cloud server 131, the edge processing server 121 may obtain a quote pertaining to the edge processing server 121 (step 207) via measuring one or more aspects of its configuration and formulating the measurement result into the respective quote, which may be denoted as $quote_{edge}$. The quote ($quote_{edge}$) pertaining to the edge processing sever 121 may be referred to as an edge processing server quote or as an intermediate apparatus quote. Although shown in the illustration of FIG. 2 as a step that follows reception of the respective trusted source data objects from the one or more data source apparatuses 111, in another example, the aspect of obtaining the edge processing server quote (step 207) may be carried out before obtaining the respective trusted source data objects form the one or more data source apparatuses 111 (steps 202 to 206) or at least partially in parallel with obtaining the respective trusted source data objects form the one or more data source apparatuses 111 (steps 202 to 206). The measurement may comprise a procedure that captures a result that is descriptive of the current configuration of hardware, software and/or firmware applied in the edge processing server 121 for acquiring and processing the respective trusted source data from the one or more data source apparatuses 111 mapped thereto. Along the lines described in the foregoing, the edge processing server quote may comprise, for example, a respective TPM quote or another quote derived using a technique known in the art.

The edge processing server 121 may further arrange the respective trusted source data objects received from the one or more data source apparatuses 111 into aggregate data, which may be denoted as $data_{edge}$, and combining the aggregate data with the edge processing server quote into an aggregate data object, denoted as $data\_obj_{edge}$. FIG. 4A schematically illustrates content of the aggregate data object according to an example. Herein, without losing generality, the aggregate data object may be alternatively referred to as an aggregate data blob or as an aggregate data bundle.

The edge processing server 121 may further apply a key, denoted as $key_{edge}$, that is unique thereto to the aggregate data object ($data\_obj_{edge}$) to derive a digital signature edge, pertaining to the aggregate data object. The digital signature may be denoted as $sig_{edge}$ and it may serve to enable subsequent verification of authenticity and/or integrity of the aggregate data object ($data\_obj_{edge}$). The digital signature pertaining to the aggregate data object generated at the edge processing server 121 may be referred to as an edge processing server signature or as an intermediate apparatus signature. The key ($key_{edge}$) applied in derivation of the edge processing server signature ($sig_{edge}$) may comprise a private key of a predefined public key cryptography scheme, which may be e.g. an attestation key obtained from a TPM module in the edge processing server 121.

The edge processing server 121 may further arrange the aggregate data object ($data\_obj_{edge}$) and the edge processing server signature ($sig_{edge}$) into a trusted aggregate data object and transmit the trusted aggregate data object to the cloud server 131, as indicated in block 209. FIG. 4B schematically illustrates content of the trusted aggregate data object according to an example.

The trusted aggregate data object composed in the edge processing server 121 may further include respective device IDs of those data source apparatuses 111 that have provided respective source data for inclusion in the aggregate data. As non-limiting examples in this regard, as described in the foregoing, a device ID of the data source apparatus 111-$k$ may be included in the trusted source data object received from the data source apparatus 111-$k$ or the respective device ID may be received at the edge processing server 121 separately from the trusted source data object. In the latter scenario, the trusted source data object received from the data source apparatus 111-$k$ may be complemented with the respective device ID at the edge processing server 121 upon composing the aggregate data, or the respective device IDs of the one or more data source apparatuses 111 may be introduced as a further data element in the aggregate data object upon composing the aggregate data object in the edge processing server 121. The trusted aggregate data object may further include or be accompanied with a device ID assigned to the edge processing server 121.

The trusted aggregate data object composed in the edge processing server 121 may further include respective source timestamps associated with the source data received for inclusion in the aggregate data. As described in the foregoing, the source timestamp associated with a trusted source data object originating from the source data apparatus 111-$k$ may be received from the source data apparatus 111-$k$ as part of the trusted source data object or (otherwise) together with the trusted source data object or it may be generated in the edge processing server 121 upon reception of the trusted source data object from the source data apparatus 111-$k$.

The trusted aggregate data object transmitted from the edge processing server 121 to the cloud server 131 may further comprise a timestamp indicating the time of producing the aggregate data object ($data\_obj_{edge}$) at the edge processing server 121 or the edge, trusted aggregate data object may be otherwise transmitted to the cloud server 131 together with such a timestamp. Such a timestamp may be referred to as an aggregate timestamp. In this regard, the aggregate timestamp associated with a certain trusted aggregate data object serves to indicate temporal relationship of the aggregate data included in the certain trusted aggregate data object originating from the edge processing server 121 to respective aggregate data included in other (earlier or later) trusted aggregate data objects transmitted from the edge processing server 121.

After having received the trusted aggregate data object from the edge processing server 121, the cloud server 131 may carry out a verification procedure to verify integrity of the data included in the trusted aggregate data object received at the cloud server 131 and/or the integrity of one or more entities involved in providing the trusted aggregate data object, e.g. the integrity of the edge processing server 121 and/or the integrity of one or more of the data source apparatuses 111-$k$. In this regard, FIG. 5 illustrates some aspects of such a verification procedure in the framework of the data acquisition system 100 according to an example.

Figure 5:
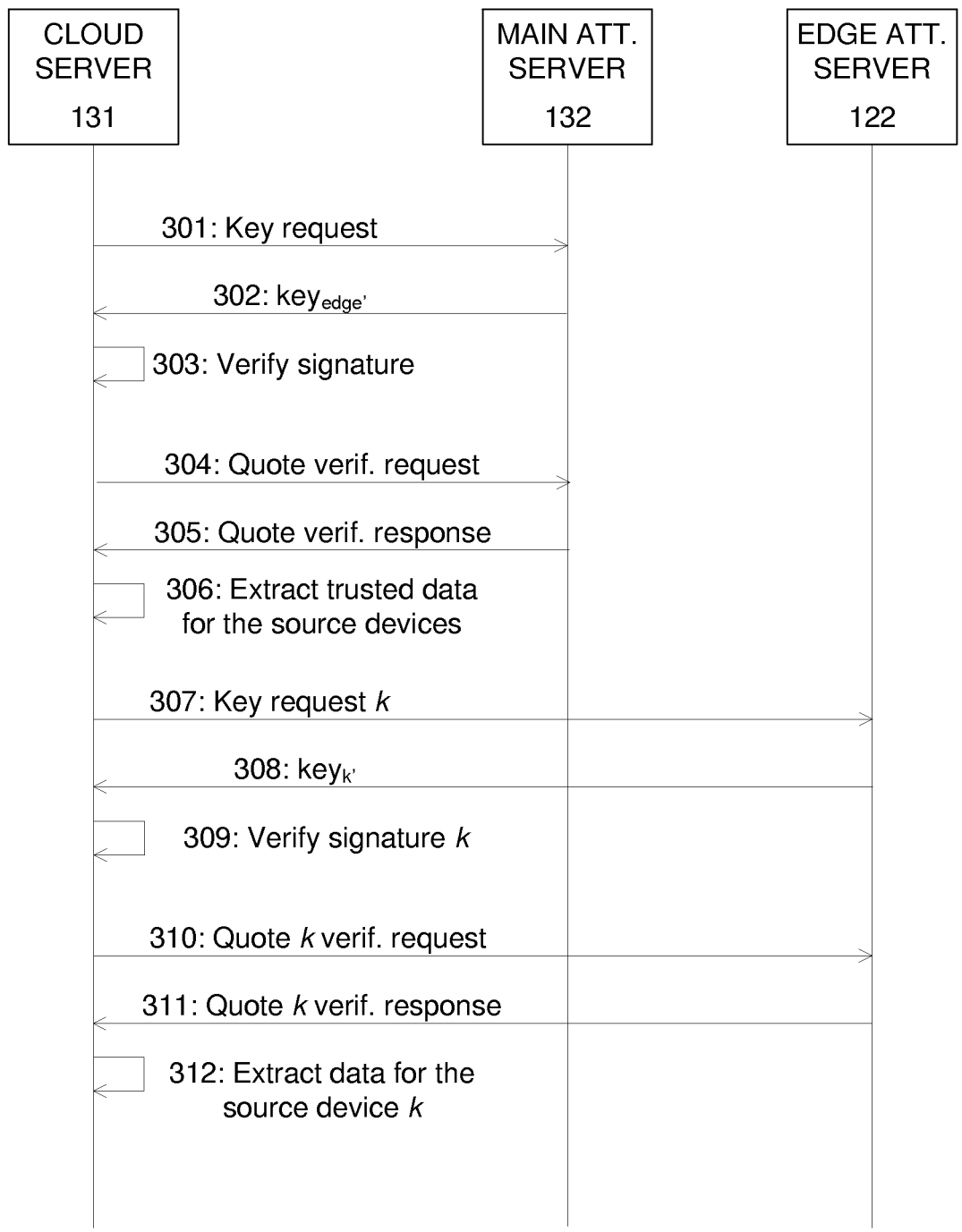
FIG. 5 illustrates some aspects of an integrity verification procedure according to an example.

The exemplifying verification procedure shown in FIG. 5 commences from verification of integrity of the aggregate data received from the edge processing server 121 as part of the trusted aggregate data object. In this regard, the verification procedure comprises the cloud server 131 sending a key request to the main attestation server 132, as indicated in step 301, and the main attestation server 132 responding by sending the requested key to the cloud server 131, as indicated in step 302. The key request may include the device ID of the edge processing server 121, which may be received from the edge processing server 121 as part of or together with the trusted aggregate data object.

The key requested and received by the cloud server 131 may be denoted as $key_{edge'}$. The key request pertains to a key that is applicable for verifying the edge processing server signature ($sig_{edge}$) derived in the edge processing server 121 upon generation of the trusted aggregate data object therein. In particular, assuming that the key ($key_{edge}$) applied in the edge processing server 121 in derivation of the edge processing server signature ($sig_{edge}$) comprises a private key of a predefined public key cryptography scheme, the requested key ($key_{edge'}$) may comprise a corresponding public key of the predefined public key cryptography scheme.

In response to reception of the key ($key_{edge'}$) from the main attestation server 132, the cloud server 131 may apply the received key to the aggregate data object ($data\_obj_{edge}$) received from the edge processing server 121 as part of the trusted edge, aggregate data object to derive a verification signature, denoted as $sig_{edge\_ver}$, pertaining to the aggregate data object, as indicated in step 303. The edge processing server signature ($sig_{edge}$) and the verification signature ($sig_{edge\_ver}$) may be applied to verify integrity of the aggregate data object: in case the verification signature $sig_{edge\_ver}$ matches the edge processing server signature $sig_{edge}$ received in the trusted aggregate data object (e.g. if $sig_{edge\_ver} = sig_{edge}$), the verification is successful and the aggregate data included in the trusted aggregate data object may be considered trustworthy, whereas in case the verification signature is different from the received signature (e.g. if $sig_{edge\_ver} \neq sig_{edge}$) the verification is unsuccessful and the aggregate data included in the trusted aggregate data object may be considered untrustworthy.

In case the verification of integrity of the aggregate data (in step 303) turns out unsuccessful, the cloud server 131 may consider the aggregate data suspicious and may discard the aggregate data in its entirety and/or issue an alert in this regard.

In case the verification of integrity of the aggregate data turns out successful, the verification procedure may further proceed to the cloud server 131 verifying integrity of the edge processing server 121 based on the edge processing server quote (quote$_{edge}$) received in the trusted aggregate data object. This may comprise the cloud server 131 sending a quote verification request to the main attestation server 132, as indicated in step 304. The quote verification request includes the edge processing server quote (quote$_{edge}$) and it may further include the device ID of the edge processing server 121.

The main attestation server 132, which is responsible for monitoring trustworthiness of the edge processing server 121, may store or compute a reference quote pertaining to the edge processing server 121, denoted as quote$_{edge\_ref}$, and may carry out the verification by comparing the quote received from the cloud server 131 to the reference quote stored or derived therein, thereby carrying out the attestation described in the foregoing: in case the quote received from the cloud server 131 matches the reference quote available at the main attestation server 132 (e.g. quote$_{edge}$=quote$_{edge\_ref}$), the verification is successful and the edge processing server 121 may be considered to have operated in a trustworthy state when creating the aggregate data, whereas in case the quote received from the cloud server 131 fails to match the reference quote (e.g. if quote$_{edge}$≠quote$_{edge\_ref}$) the verification is unsuccessful and the edge processing server 121 may be considered to have operated in an untrustworthy state when creating the aggregate data.

The result of the verification (e.g. attestation) that indicates either successful verification or unsuccessful verification is communicated in a quote verification response from the main attestation server 132 to the cloud server 131, as indicated in step 305. Consequently, the cloud server 131 may determine integrity of the edge processing server 131 based on the verification result: in case the verification of integrity of the edge processing server 121 turns out unsuccessful, the cloud server 131 may consider the edge processing server 121 suspicious and may discard the aggregate data in its entirety and/or issue an alert in this regard.

In case the verification of integrity of the edge processing server 121 turns out successful, the cloud server 131 may proceed to extracting, from the aggregate data received from the edge processing server 121, the respective trusted source data object obtained for the one or more data source apparatuses 111 mapped to the edge processing server 121, as indicated in step 306, and further to verifying integrity of the respective trusted source data object obtained from the one or more data source apparatuses 111.

Along the lines described in the foregoing, the trusted source data object for the data source apparatus 111-$k$ includes the source data object (data_obj$_k$) including the actual source data obtained at the source apparatus 111-$k$ (data$_k$) and the respective data source quote (quote$_k$) together with the data source signature (sig$_k$) derived at the data source apparatus 111-$k$. In this regard, the verification of integrity of the source data object (data_obj$_k$) received for the data source apparatus 111-$k$ comprises the cloud server 131 sending a key request to the edge attestation server 122, as indicated in step 307, and the edge attestation server 122 responding by sending the requested key to the cloud server 131, as indicated in step 308. The key request may include device ID of the data source apparatus 111-$k$, which may be received from the edge processing server 121 as part of the trusted aggregate data object.

The key requested and received by the cloud server 131 may be denoted as key$_{k'}$. The key request pertains to a key that is applicable for verifying the data source signature (sig$_k$) derived in the data source apparatus 111-$k$ upon acquiring the source data therein. In particular, assuming that the key (key$_k$) applied in the data source apparatus 111-$k$ in derivation of the data source signature (sig$_k$) comprises a private key of a predefined public key cryptography scheme, the requested key (key$_{k'}$) may comprise a public key of the predefined public key cryptography scheme.

In case the requested key for the data source apparatus 111-$k$ is not available in the edge attestation server 122, it may respond by sending an indication in this regard to the cloud server 131, which may consider a failure to receive the requested key as indication of an untrustworthy status of the data source apparatus 111-$k$ and, consequently, discard the source data received for the data source apparatus 111-$k$. The edge attestation server 122 may store information concerning the one or more data source apparatuses 111 mapped to the edge processing server 121 and may respond to a key request pertaining to a data source apparatus 111-$k$ that is not mapped to the edge processing server 121 by sending an indication in this regard to the cloud server 131, which may consider such an indication to suggest an untrustworthy status of the data source apparatus 111-$k$ and, consequently, discard the source data received for the data source apparatus 111-$k$.

In response to reception of the key (key$_{k'}$) from the edge attestation server 122, the cloud server 131 may apply the received key to the source data object (data_obj$_k$) received for the data source apparatus 111-$k$ as part of the trusted aggregate data object to derive a verification signature pertaining to the data source apparatus 111-$k$, denoted as sig$_{k\_ver}$, as indicated in step 309. The verification signature pertaining to the data source apparatus 111-$k$ may be applied to verify integrity of the respective source data object (data_obj$_k$): in case the verification signature sig$_{k\_ver}$ matches the signature sig$_k$ received from the edge processing server 121 as part of the trusted aggregate data object (e.g. if sig$_{k\_ver}$=sig$_k$), the verification is successful and the source data object (data_obj$_k$) originating from the data source apparatus 111-$k$ may be considered trustworthy, whereas in case the verification signature is different from the received signature (e.g. if sig$_{k\_ver}$≠sig$_k$) the verification is unsuccessful and the source data object (data_obj$_k$) originating from the data source apparatus 111-$k$ may be considered untrustworthy.

In case the verification of integrity of the source data object (data_obj$_k$) originating from the data source apparatus 111-$k$ (in step 309) turns out unsuccessful, the cloud server 131 may consider the respective source data suspicious and may discard the data originating from the data source apparatus 111-$k$ and/or issue an alert in this regard.

In case the verification of integrity of the source data object (data_obj$_k$) received for the data source apparatus 111-$k$ (in step 309) turns out successful, the verification procedure may further proceed to the cloud server 131 verifying integrity of the data source apparatus 111-$k$ based on the data source quote (quote$_k$) pertaining thereto received in the trusted aggregate data object. This may comprise the cloud server 131 sending a quote verification request to the edge attestation server 122, as indicated in step 310. The quote verification request includes the data source quote (quote$_k$) pertaining to the data source apparatus 111-$k$ and it may further include the device ID of the data source apparatus 111-$k$ to which the data source quote pertains. As described in the foregoing, such device ID may be received from the edge processing server 121 as part of the trusted aggregate data object.

The edge attestation server 122, which is responsible for monitoring trustworthiness of the data source apparatus 111-$k$, may store or derive a reference quote pertaining to the data source apparatus 111-$k$, denoted as quote$_{k\_ref}$, and may carry out the verification by comparing the quote received from the cloud server 131 to the reference quote stored or derived therein, thereby carrying out the attestation described in the foregoing: in case the quote received from the cloud server 131 matches the respective reference quote available at the edge attestation server 122 (e.g. quote$_k$=quote$_{k\_ref}$), the verification is successful and the data source apparatus 111-$k$ may be considered to have operated in a trustworthy state when creating the respective source data, whereas in case the quote received from the cloud server 131 fails to match the respective reference quote (e.g. if quote$_k$≠quote$_{k\_ref}$) the verification is unsuccessful and the data source apparatus 111-$k$ may be considered to have operated in an untrustworthy state when creating the respective source data.

The result of the verification (e.g. attestation) that indicates either successful verification or unsuccessful verification is communicated in a quote verification response from the edge attestation server 122 to the cloud server 131, as indicated in step 311. Consequently, the cloud server 131 may determine integrity of the data source apparatus 111-$k$ based on the verification result: in case the verification of integrity of the data source apparatus 111-$k$ turns out unsuccessful, the cloud server 131 may consider the data source apparatus 111-$k$ suspicious and may discard the source data originating therefrom and/or issue an alert in this regard. In case the verification of integrity of the data source apparatus 111-$k$ turns out successful, the cloud server 131 may proceed with extracting the respective source data from the aggregate data, as indicated in step 312, and further proceed with storing and/or processing the source data originating from the data source apparatus 111-$k$ according to procedure(s) defined therefor.

The cloud server 131 may repeat the steps 307 to 312 that pertain to respective verifications of the integrity of the respective source data received from the data source apparatus 111-$k$ and the integrity of the respective data source apparatus 111-$k$ itself for at least one (e.g. each) of the one or more data source apparatuses 111 mapped to the edge processing server 121.

In another example, additionally or alternatively, the verification of integrity of the source data object received for the data source apparatus 111-$k$ and/or the verification of integrity of the data source apparatus 111-$k$ may be carried out in the edge processing server 121, the edge processing server 121 thereby carrying out the steps 307 to 311 of the exemplifying verification procedure of FIG. 5, mutatis mutandis. In case the integrity verification (of the source data object or of the data source apparatus 111-$k$) turns out unsuccessful, the edge processing server 121 may refrain from including the trusted source data object received for the source data apparatus 111-$k$ in the aggregate data. In this approach, the edge processing server 121 may have or may acquire the knowledge of the key (key$_k$) required for verification of integrity of the source data object for the data source apparatus 111-$k$.

The respective communicative couplings between elements of the data acquisition system 100 may be provided using any applicable wired or wireless communication technique known in the art via a wired or wireless communication network(s) and/or via respective wired or wireless communication links. As a non-limiting example in this regard, the one or more data source apparatuses 111 may be coupled to the edge processing server 121 over respective wireless links whereas the coupling between the edge processing server 121 and the cloud server 131 may be provided via a communication network such as the Internet. The respective wireless links between the one or more data source apparatuses 111 and the edge processing server may be provided using a cellular communication technology such as the third, fourth of fifth generation of wireless digital cellular (tele)communication technology (3G, 4G, 5G, respectively) or by using a suitable short-range wireless communication technique known in the art that enables wireless communication over ranges from a few meters up to a few hundred meters, such as Bluetooth, Bluetooth Low-Energy, ZigBee, WLAN/Wi-Fi according to an IEEE 802.11 family of standards, LR-WPAN according to an IEEE 802.15.4 standard, etc.

In one example, the data acquisition may be provided in a 5G cellular communication system such that the one or more data source apparatuses 111 may be provided as respective wireless 5G devices that are wirelessly coupled to the edge processing server 121 provided in a 5G base station, whereas the cloud server 131 may be provided in a core network of the 5G communication system. In another example, the data source apparatuses 111 may be provided as ones that are wirelessly coupled to a mobile user device using a short-range wireless communication technique (e.g. one of the examples described in the foregoing), wherein the mobile user device is arranged to operate as the edge processing server 121 and it is coupled to the cloud server 131 via a cellular communication network (e.g. one of the examples described in the foregoing). In the latter example, the mobile user device that serves to provide the edge processing server 121 functionality may comprise a wearable computer such as one embedded into a garment or a smartwatch, a mobile phone, a tablet computer, a laptop computer, etc.

Regardless of the manner of communicative coupling between elements of the data acquisition system 100, the one or more data source apparatuses 111 therein may be provided, for example, as respective sensor devices (as described in the foregoing), thereby rendering the data acquisition system 100 as a sensor data acquisition system that is applicable, for example, in an Internet of Things (IoT) framework for industrial and/or commercial purposes or as a system for monitoring physiological and/or biophysiological state of a human subject for medical, healthcare, behavioral monitoring and/or personal health monitoring purposes.

The mapping of the one or more data source apparatuses 111 to the edge processing server 121 may be established via a usage of a suitable device mapping procedure that ensures providing the edge processing server 121, the edge attestation server 122 and the cloud server 131 with information that enables integrity verification of the one or more data soured apparatuses 111 and the source data obtained therefrom. In this regard, FIG. 6 illustrates some aspects of a device mapping procedure in the framework of the data acquisition system 100 according to an example.

Figure 6:
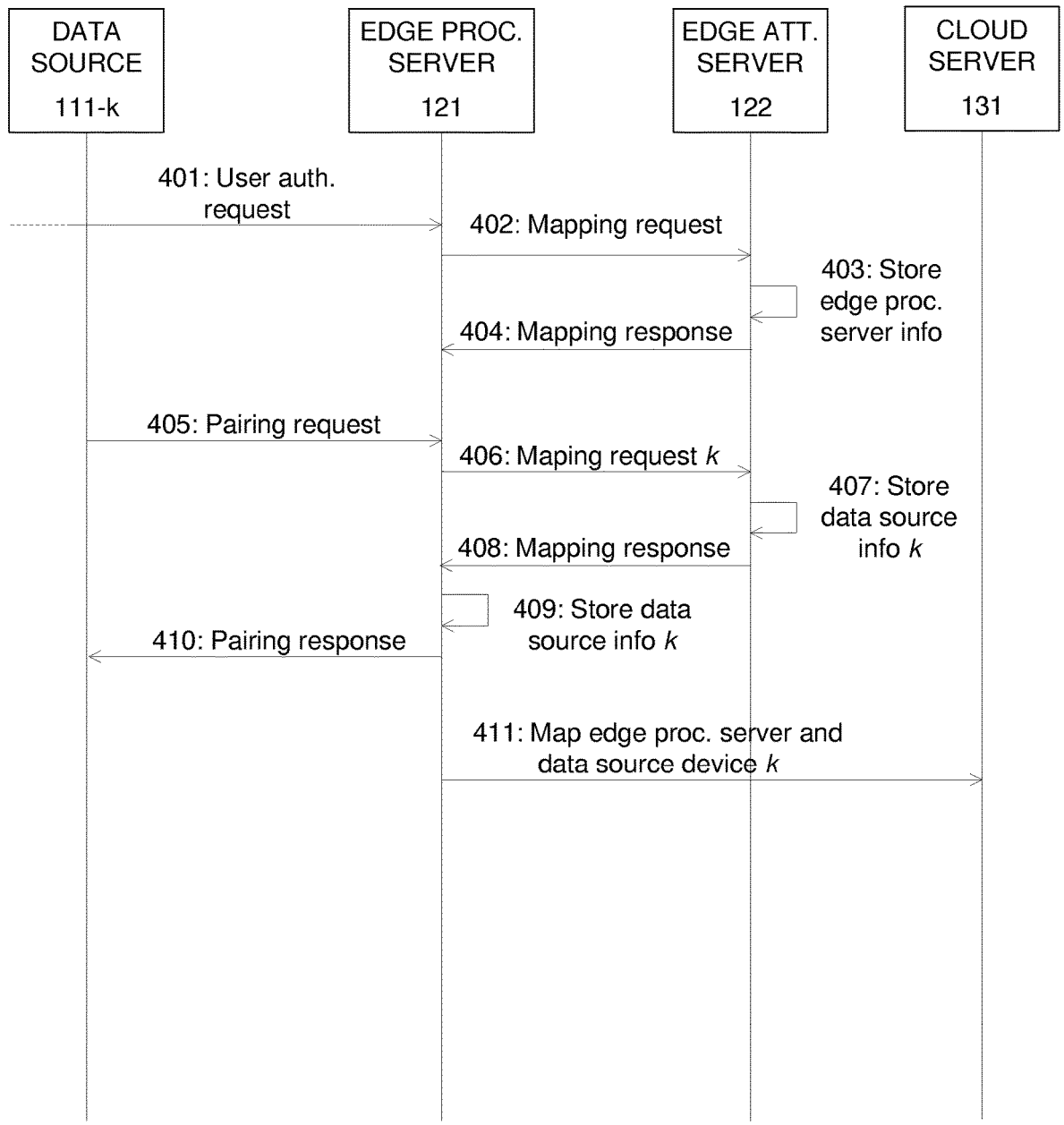
FIG. 6 illustrates some aspects of a device mapping procedure according to an example.

The exemplifying device mapping procedure shown in FIG. 6 proceeds from the edge processing server 121 authenticating a user of the data acquisition system 100, as indicated in step 401. The authentication may be carried out using any suitable authentication mechanism known in the art, e.g. via the user entering a PIN or a combination of a username and a password or passphrase via a user interface of a device implementing the edge processing server 121, via a fingerprint sensor provided in a device implementing the edge processing server 121, via a RFID reader in a device implementing the edge processing server 121 reading valid authentication data from a RFID tag provided by the user, etc. A successful authentication may result in the edge processing server 121 obtaining a user identification (user ID) assigned to the respective user, i.e. the user ID associated with credentials input by the user upon authentication.

After successful user authentication (step 401) the device mapping procedure continues with the edge processing server 121 sending an edge server mapping request to the edge attestation server 122, as indicated in step 402. The mapping request includes the device ID of the edge attestation server 121, the user ID obtained in the user authentication, and a key assigned to the edge processing server 121. Herein, the key may comprise the unique key ($key_{edge}$) assigned to the edge processing server 121 that enables subsequent verification of the edge processing server signature ($sig_{edge}$). The edge attestation server 122 stores the information received in the mapping request in a memory therein, as indicated in step 403, and sends a mapping response to the edge processing server 121 to indicate successful reception of the mapping request, as indicated in step 404.

The device mapping procedure continues with the edge processing server 121 receiving a pairing request from the data source apparatus 111-$k$, as indicated in step 405. The data source apparatus 111-$k$ may be preconfigured to send the pairing request to the edge processing server 121 when turned on or activated, provided that the data source apparatus 111-$k$ is not already paired with the edge processing server 121 or with another device. The pairing request originating from the data source apparatus 111-$k$ comprises the device ID of the data source apparatus 111-$k$ and a key assigned to the data source apparatus 111-$k$. In this regard, the key included in the pairing request may comprise the unique key ($key_{k'}$) assigned to the data source apparatus 111-$k$ that enables subsequent verification of the data source signature ($sig_k$). The procedure proceeds with the edge processing server 121 sending a mapping request concerning the data source apparatus 111-$k$ to the edge attestation server 122, as indicated in step 406. The mapping request concerning the data source apparatus 111-$k$ comprises the device ID of the data source apparatus 111-$k$, the device ID of the edge processing server 121 and the unique key ($key_{k'}$) assigned to the data source apparatus 111-$k$ and it may further comprise the user ID obtained as the result of the user authentication (step 401), thereby providing the edge attestation server 122 with information that enables mapping the data source apparatus 111-$k$ to the edge processing server 121 and to the authenticated user and further enables subsequent integrity verification of the data source apparatus 111-$k$ and/or the source data received therefrom.

The edge attestation server 122 may further store, in a memory therein, the information received from the edge processing server 121 in the mapping request concerning the data source apparatus 111-$k$, as indicated in step 407, and send, to the edge processing server 121, a mapping response that indicates successful mapping at the edge attestation server 121, as indicated in step 408. The edge processing server 121 may respond to reception of the mapping response from the edge attestation server 122 by storing, in a memory therein, the information received in the pairing request originating from the data source apparatus 111-$k$ (e.g. the device ID of the data source apparatus 111-$k$ and the unique key ($key_{k'}$) assigned to the data source apparatus 111-$k$), as indicated in step 409. The stored information in this regard may be referred to as pairing information pertaining to the data source apparatus 111-$k$ and it may serve as a record pertaining to the (successful) pairing between the edge processing server 121 and the data source apparatus 111-$k$. The edge processing server 121 may further respond to reception of the mapping response from the edge attestation server 122 by sending a pairing response to the data source apparatus 111-$k$, as indicated in step 410, thereby providing the data source apparatus 111-$k$ with an indication of successful pairing with the edge processing server 121.

Still referring to the device mapping procedure according to the example of FIG. 6, steps 405 to 410 pertaining to the pairing of the data source apparatus 111-$k$ with the edge processing server 121 and the edge processing server 121 providing the edge attestation server 122 with mapping information pertaining to the edge processing server 121 may be repeated for each of the one or more data source apparatuses 111 to be mapped to the edge processing server 121. Once each of the one or more data source apparatus 111 under consideration have been mapped to the edge processing server 121, the edge processing server 121 may send, to the cloud server 131, information that maps the one or more data source apparatuses 111 and the edge processing server 121 to the user ID obtained in the user authentication, as indicated in step 411, thereby providing the cloud server 131 with information that enables associating the source data originating from the one or more data source apparatuses 111 to the user associated with this user ID.

Figure 7:
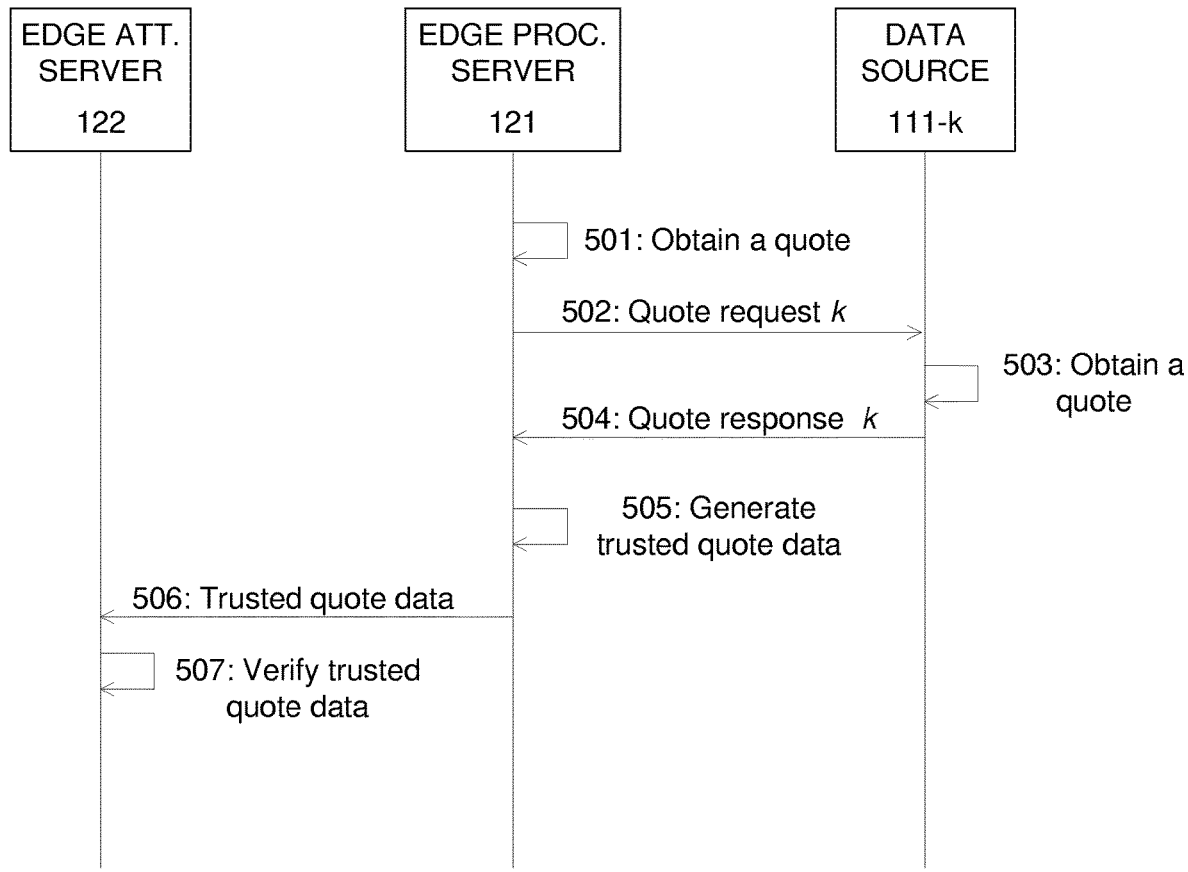
FIG. 7 illustrates some aspects of a remote attestation procedure according to an example.

As described in the foregoing, the remote attestation procedure between a given pair of a monitoring entity and a monitored entity may be carried out e.g. in response to a request and/or according to a respective predefined time schedule, e.g. periodically at respective predefined time intervals. FIG. 7 illustrates some aspects of an attestation procedure according to an example, which attestation procedure involves the data source apparatus 111-$k$, the edge processing server 121 and the edge attestation server 122 and which may be triggered by an explicit request or via a predefined schedule.

The exemplifying attestation procedure shown in FIG. 7 proceeds from receiving a request to carry out the attestation procedure. Such a request may be triggered, for example, by an explicit request or via a predefined schedule. The attestation procedure commences from the edge processing server 121 obtaining a quote pertaining to itself, as indicated in step 501. The edge processing server 121 may obtain the quote via measuring one or more aspects of its configuration and formulating the measurement result into the respective quote. In this regard, the quote obtained at the edge processing server 121 may comprise the edge processing server $quote_{edge}$ described in the foregoing and it may be derived in a manner described in the foregoing in context of the of the data acquisition procedure (cf. step 207 therein).

The exemplifying attestation procedure of FIG. 7 continues with the edge processing server 121 sending a quote request to the data source apparatus 111-$k$, as indicated in step 502, the data source apparatus 111-$k$ obtaining a quote pertaining to itself, as indicated in step 503, and the data source apparatus 111-$k$ sending a quote obtained therein in a quote response to the edge processing server 121, as indicated in step 504. The aspect of obtaining the quote pertaining to the data source apparatus 111-$k$ (step 503) may comprise the data source apparatus 111-$k$ measuring one or more aspects of its configuration and formulating the measurement result into the respective quote. In this regard, the quote obtained at the data source apparatus 111-$k$ may comprise the data source quote quote$_k$ described in the foregoing and it may be derived in a manner described in the foregoing in context of the of the data acquisition procedure (cf. step 204 therein).

The exemplifying attestation procedure according to FIG. 7 may further comprise the edge processing server 121 sending a respective quote request to each of the one or more data source apparatuses 111 mapped thereto, the respective one of the one or more data source apparatuses 111 obtaining a respective data source quote pertaining to itself therein and transmitting the respective data source quote to the edge processing server 121 in a respective quote response, thereby repeating the steps 502 to 204 of FIG. 7 for each of the one or more data source apparatuses 111 mapped the edge processing server 121.

Although shown in the illustration of FIG. 7 as a step that precedes reception of the respective data source quotes from the one or more data source apparatuses 111, in another example, the aspect of obtaining the edge processing server quote (step 501) may be carried out after obtaining the respective data source quotes from the one or more data source apparatuses 111 (steps 502 to 504) or at least partially in parallel with obtaining the respective data source quotes from the one or more data source apparatuses 111 (steps 502 to 504)

Figure 8:
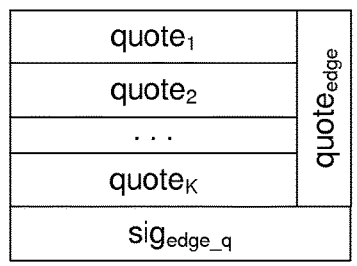
FIG. 8 schematically illustrates content of a trusted aggregate quote object according to an example.

The exemplifying attestation procedure according to FIG. 7 may further continue by thy edge attestation server 121 generating, based on the respective data source quotes (quote$_k$) received from the one or more data source apparatuses 111 and the edge processing server quote (quote$_{edge}$), a trusted aggregate quote object, as indicated in step 505, and the edge processing server 121 transmitting the trusted aggregate quote object to the edge attestation server 122, as indicated in step 506. The trusted aggregate quote object may be also referred to as trusted quote data. In this regard, generation of the trusted aggregate quote object at the edge processing server 121 may comprise arranging the respective data source quotes (quote$_k$) received from the one or more data source apparatuses 111 and the edge processing server quote (quote$_{edge}$) into an aggregate quote object and applying a key that is unique to the edge processing server 121, e.g. the key key$_{edge}$ described in the foregoing, to the aggregate quote object to derive a digital signature pertaining to the aggregate data object. The digital signature may be denoted as sig$_{edge\_q}$ and it may serve to enable subsequent verification of authenticity and/or integrity of the aggregate quote object. The digital signature pertaining to the aggregate quote object generated at the edge processing server 121 may be referred to as an edge processing server quote signature or as an intermediate apparatus quote signature. FIG. 8 schematically illustrates content of the trusted aggregate quote object according to an example.

The exemplifying attestation procedure according to FIG. 7 may further continue by the edge attestation server 122 verifying integrity of the aggregate quote object received from the edge processing server 121 as part of the trusted aggregate quote object. In this regard, the verification procedure comprises the edge attestation server 122 applying a key that is applicable for verifying the edge processing server quote signature, e.g. the key key$_{edge}$' described in the foregoing, to the aggregate quote object received from the edge processing server 121 as part of the trusted aggregate quote object to derive a respective verification signature, denoted as sig$_{edge\_q\_ver}$, pertaining to the aggregate quote object and verifying the integrity of the aggregate quote object via comparison of the edge processing server signature received in the trusted aggregate quote object and the derived verification signature: in case the verification signature sig$_{edge\_q\_ver}$ matches the edge processing server quote signature sig$_{edge\_q}$ received in the trusted aggregate quote object (e.g. if sig$_{edge\_q\_ver}$=sig$_{edge\_q}$), the verification is successful and the quotes included in the aggregate quote object may be considered trustworthy, whereas in case the verification signature is different from the received signature (e.g. if sig$_{edge\_q\_ver}$≠sig$_{edge\_q}$) the verification is unsuccessful and the quotes included in the aggregate quote object may be considered untrustworthy.

In case the verification of integrity of the aggregate quote object (in step 507) turns out unsuccessful, the edge attestation server 122 may consider the integrity of the aggregate quote object to be compromised and may discard the quotes received in the aggregate quote object and/or issue an alert in this regard. In case the verification of integrity of the aggregate quote object (in step 507) turns out successful, the exemplifying attestation procedure of FIG. 7 may continue or may be followed out by the edge attestation server 122 verifying the integrity of the edge attestation server 121 comparison of the edge processing server quote (quote$_{edge}$) received in the aggregate quote object to a respective reference quote (quote$_{edge\_ref}$) obtained earlier and/or the edge attestation server 122 verifying the integrity of the one or more data source apparatuses 111 via comparison of the respective data source quote (quote$_k$) received in the aggregate quote object to a respective reference quote (quote$_{k\_ref}$) obtained earlier. Such comparisons may be carried in a manner described in the foregoing in context of the exemplifying verification procedure of FIG. 5, mutatis mutandis.

In the exemplifying attestation procedure according to FIG. 7 described in the foregoing, the edge attestation server 122 is assumed to have a knowledge of and/or an access to the one or more data source apparatuses 111 that are mapped to the edge processing server 121 via the edge processing server 121 and, consequently, the attestation of the one or more data source apparatuses 111 may be carried out via the edge processing server 121. In a variation of this example, the edge attestation server 122 may have a direct knowledge and/or a direct access to the one or more data source apparatuses 111 that are mapped to the edge processing server 121 and, consequently, the edge attestation server 122 may directly request and receive the respective data source quotes (quote$_k$) from the one or more data source apparatuses 111 (cf. steps 502 to 504) instead of obtaining them in the trusted aggregate quote object via the edge processing server 121 whereas the generation of the trusted aggregate quote object (cf. step 505) and verification of its integrity (in step 507) may be omitted and the attestation procedure may directly proceed to comparison of the received data source quotes (quote$_k$) and the edge processing server quote (quote$_{edge}$) with the respective reference quotes.

In another variation of the exemplifying attestation procedure according to FIG. 7 the procedure involves usage of the edge attestation server 122 for attestation of the one or more data source devices 111 while the main attestation server 132 is applied for attestation of the edge processing server 121. In this variation the edge attestation server 122 obtains the respective data source quotes (quote$_k$) from the one or more data source devices 111 as described in the foregoing (either directly or via the edge processing server 121) and carries out the attestation via comparison of the received data source quotes (quote$_k$) with the respective reference quotes (quote$_{k\_ref}$), whereas the main attestation server 132 requests and receives the edge processing server quote (quote$_{edge}$) from the edge processing server 121 and carries out the attestation via comparison of the received edge processing server quote (quote$_{edge}$) with the respective reference quote (quote$_{edge\_ref}$).

As described in the foregoing, one of the non-limiting example applications for the data acquisition system 100 involves monitoring the behavioral, physiological and/or biophysiological state of a human or animal subject for medical or healthcare purposes, wherein the one or more data source apparatuses 111 may be provided as respective sensor devices, each including one or more sensors arranged to observe a respective behavioral, physiological and/or biophysiological characteristics of the subject. Assuming a human subject, the edge processing server 121 may be provided, for example, as or by a personal device of the human subject that is typically or frequently worn or carried by the human subject, whereas in another example the edge processing server 121 may be provided as or by a device that resides in the same space with or is otherwise located near the human subject. Non-limiting examples of such behavioral, physiological and/or biophysiological characteristics of the human subject include the one described in the foregoing: body temperature, blood flow, heart rate, breathing, gastro intestinal track mobility, muscle tension, glucose level, oxygen saturation, an ECG, an EEG, brain evoked response(s) to sensory stimuli (ERP), an EOG, an ENG, an ENMG, a MEG, an aspect of movement of the human subject (e.g. movement of the torso, movement of one or more limbs, movement of the head, . . . ), etc., whereas non-limiting examples of such personal device include the following: a wearable computer (such as a smartwatch), a mobile phone, a tablet computer, a desktop computer, a computer device designed to serve as the personal device in such a context, etc.

While the characteristics of the data acquisition system 100 enable ensuring integrity of the source data received at the cloud server 131 and the integrity of the devices (the one or more data source devices 111 and the edge processing server 121) involved in acquisition of the source data, in a scenario where the data acquisition system 100 is applied for acquiring the source data from the one or more data source apparatuses 111 provided as respective sensor devices, a related aspect of reliability of the source data involves ensuring that the data acquired by the one or more sensor devices is not affected or disturbed by environmental conditions in the location of measurement. As an example, a sensor device exposed to (unwanted) excessive heat and/or (unwanted) light from an external source may result in obtained biased source data from the respective sensor device, thereby possibly compromising quality and/or reliability of the source data despite the integrity of its delivery from the respective sensor device to the cloud server 131. Hence, in scenarios where environmental factors are likely to have a detrimental effect on the quality and/or reliability of the source data obtained from a given data source apparatus 111-$k$, arrangement of the one or more data source apparatuses 111 in their usage location such that unwanted effects from environmental factors are minimized or eliminated and/or application of protective measures for protecting the one or more data source apparatuses 111 in their usage location from unwanted environmental factors may facilitate further strengthening the quality and reliability of the acquired source data.

Figure 9:
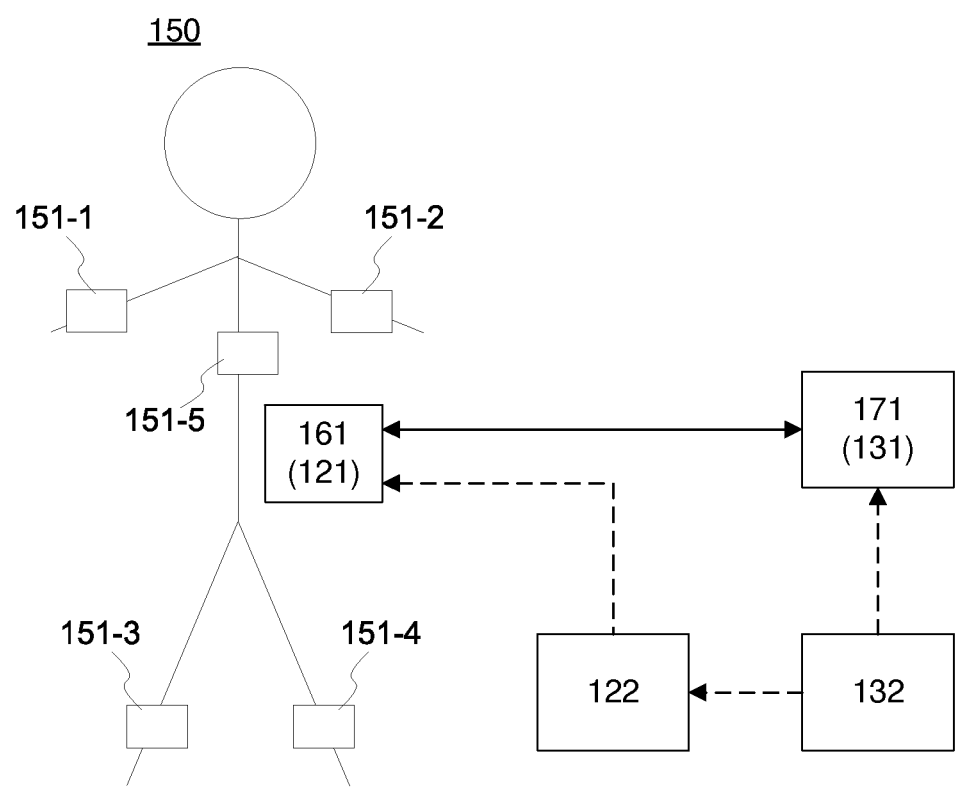
FIG. 9 illustrates usage of the data acquisition system according to an example.

FIG. 9 schematically illustrates an example of such usage of the data acquisition system 100, involving the user wearing sensor devices 151-1, 151-2, 151-3, 151-4, 151-5 that each are arranged to monitor a respective behavioral characteristic of a patient 150 and a mobile device 161 arranged to provide or serve as the edge processing server 121 that is coupled to the cloud server 131, which is arranged to provide a data processing application 171 for processing the source data acquired from the sensor devices 151-1 to 151-5. Herein, the behavioral characteristic may comprise, for example, one of the following: a biological characteristic of the patient 150, a physiological characteristic of the patient 150, a biophysiological characteristic of the human subject 150, an aspect of mental characteristics of the patient 150. Moreover, due processing of respective source data that is descriptive of a respective behavioral characteristic of the patient 150, the data processing application 171 may be also referred to as behavioral data processing application or as a (bio)physiological data processing application. Yet further, although the reference is made to the patient 150, the exemplifying usage of the data acquisition system 100 according to the example of FIG. 9 is not limited to a medical or healthcare context but it is readily applicable for acquiring sensor data pertaining to the respective one or more behavioral characteristics of a human or animal for any foreseeable purpose.

Without losing generality, it may be assumed that the sensor devices 151-1 to 151-4 are arranged for observing movement of a respective limb of the patient 150 whereas the sensor device 151-5 may be arranged for observing the heart rate of the patient 150. Moreover, in a general case the sensor devices 151-1 to 151-5 serve to represent any one or more sensor devices 151 arranged to monitor any desired combination of one or more physiological and/or physiological characteristics of the patient 150, where an individual sensor device may be referred to as a sensor device 151-$k$. The sensor device 151-$k$ may be any type of sensor arranged for non-invasive or invasive monitoring of the respective behavioral characteristic of the patient 150, e.g. a sensor device arranged on or immediate proximity of the patient 150, a sensor device arranged under the skin of the patient 150 (or otherwise inside the body of the patient 150) or a sensor arranged in the environment of the patient 150 (e.g. embedded in a chair or in a bed).

As described in the foregoing, the edge attestation server 122 may be provided for monitoring the trustworthiness of the sensor devices 151-1 to 151-5 and the trustworthiness of the mobile device 161, whereas the main attestation server 132 may be provided for monitoring the trustworthiness of the edge processing server 121 and the trustworthiness of the cloud server 131. Hence, the data acquisition system 100 arranged according to the schematic example of FIG. 9 (or according to a variation thereof) enables both offline and online monitoring of one or more aspects of behavioral state of the patient 150.

Figure 10:
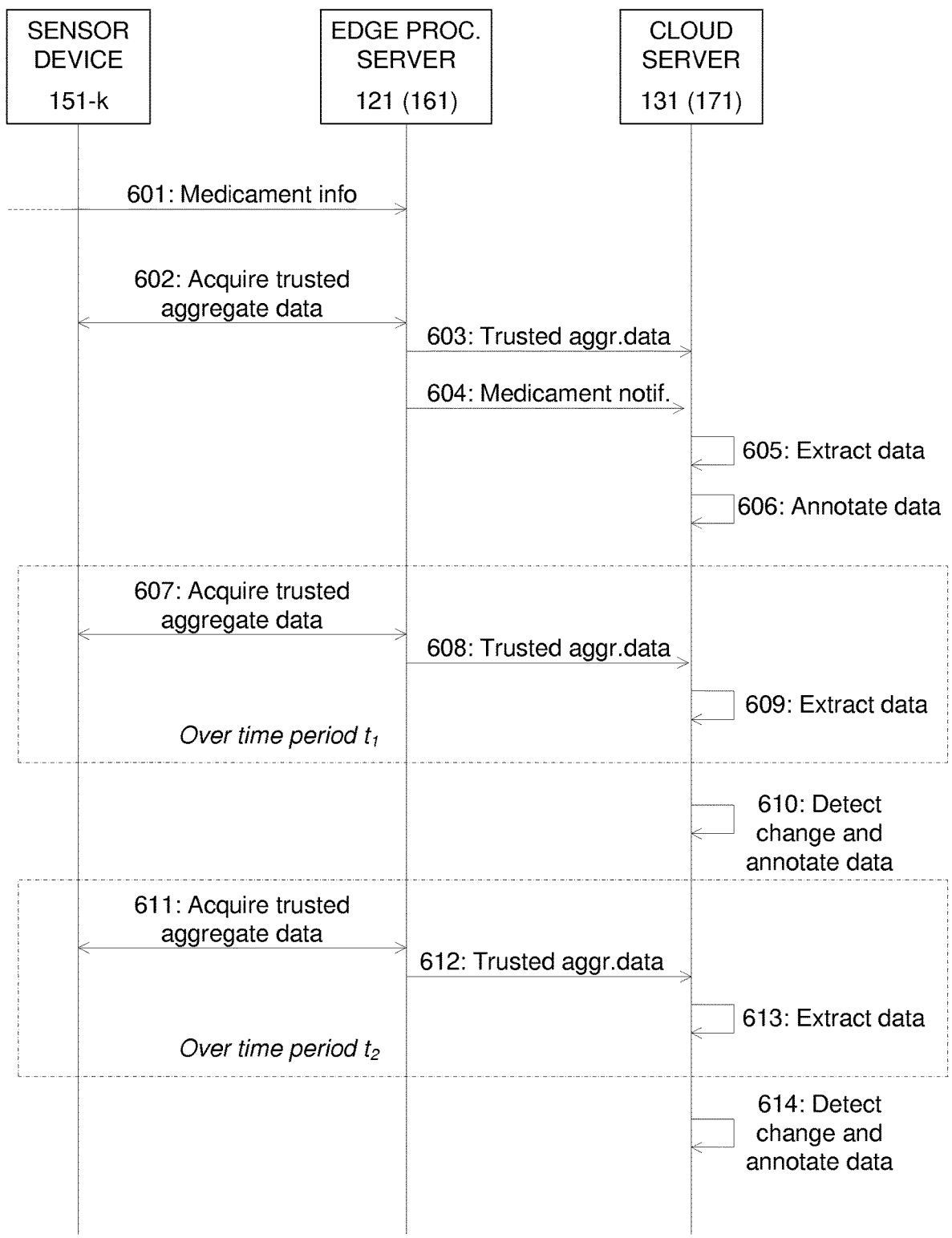
FIG. 10 illustrates some aspects of a monitoring procedure according to an example.

In addition to the exemplifying operations, procedures and/or functions described in the foregoing with references to the data acquisition system 100, the example according to the arrangement of FIG. 9 may be arranged to carry out a monitoring procedure according to an example illustrated in FIG. 10. This exemplifying monitoring procedure proceeds from the edge processing server 121 (in the mobile device 161) receiving a medicament information, as indicated in step 601. The medicament information serves as indication of the patient 150 having taken a medicament and it may comprise a medicament ID assigned for the medicament and a timestamp that indicates the time of the patient 150 having taken the medicament. According to an example, the medicament information may be received as user input via a user interface of the mobile device 161, whereas in another example the medicament is provided in form of a smart pill (as known in the art) that has the medicament ID encoded therein and that is arranged to send the medicament information to the edge processing server 121 in response to the user having taken the smart pill.

The exemplifying monitoring procedure of FIG. 10 continues with the edge processing server 121 acquiring the respective trusted source data from the one or more sensor devices 151 mapped thereto and arranging the received trusted source data objects into the trusted aggregate data object, as indicated in step 602 and transmitting the trusted aggregate data object to the data processing application 171 in the cloud server 131, as indicated in step 603. In this regard, the steps 602 and 603 may be implemented, for example, according to steps 202 to 209 of the exemplifying data acquisition procedure described in the foregoing. The edge processing server 121 may further transmit a medicament notification to the data processing application 171 in the cloud server 131, as indicated in step 604. The medicament notification includes the medicament ID and it serves as an indication for the data processing application 171 in the cloud server 131 with respect to the patient 150 having taken the medicament identified by the medicament ID. In another example, the order of transmitting the trusted aggregate data object and the medicament notification (i.e. the order of steps 603 and 604) is the opposite of that shown in the illustration of FIG. 10.

In response to receiving the trusted aggregate data object and the medicament notification, the data processing application 171 in the cloud server 131 extracts the source data originating from the one or more sensor devices 151, as indicated in step 605. The data extraction may be provided via the exemplifying verification procedure described in the foregoing with references to FIG. 5, thereby at the same time ensuring the integrity of the data received from the one or more sensor devices 151 mapped to the edge processing server 121, the integrity of the one or more sensor devices 151 upon production of the respective source data and the integrity of the edge processing server 121 (in the mobile device 161) upon production of the aggregate data therein. Assuming successful integrity verification procedure, the monitoring procedure proceeds to the data processing application 171 in the cloud server 131 annotating the extracted data (received in step 603) as respective first reference data obtained upon the patient 150 taking the medicament identified by the received medicament ID, as indicated in step 606.

The exemplifying monitoring procedure of FIG. 10 continues with the edge processing server 121 acquiring the respective trusted source data from the one or more sensor devices 151 mapped thereto and arranging the received trusted source data objects into the trusted aggregate data object, as indicated in step 607, the edge processing server 121 transmitting the trusted aggregate data object to the data processing application 171 in the cloud server 131, as indicated in step 608, and the data processing application 171 in the cloud server 131 extracting (and storing) the source data originating from the one or more sensor devices 151, as indicated in step 609. As in step 605, the data extraction may be provided via the exemplifying verification procedure described in the foregoing with references to FIG. 5. The steps from 607 to 609 may be repeated until detecting a first change in the source data in comparison to the first reference data (defined in step 606), as indicated in step 610. The first change in the source data may be detected in response to observing a respective change that exceeds a respective change threshold in the source data originating from predefined one(s) of the one or more sensor devices 151. Herein, a time period from production of the first reference data until detecting the first change may be referred to as a first time period $t_1$. The first time period $t_1$ may be defined, for example, based on the respective source timestamps or aggregate timestamps received in the respective trusted aggregate data objects obtained at the cloud server 131 in step 603 and in step 609 (upon detecting the first change).

The detection of the first change in the source data involved in step 610 may further comprise or be followed by the data processing application 171 in the cloud server 131 annotating the source data received during the first time period $t_1$ accordingly. In this regard, the annotation of the source data may comprise annotating each source data item obtained during the first time period $t_1$ as one belonging to the first time period $t_1$ and/or annotating the source data received in the trusted aggregate data object that served to terminate the first time period $t_1$ as second reference data. According to an example, the first time period $t_1$ that starts upon the patient 150 taking the medicament identified by the medicament ID and ends upon detecting the first change in the obtained source data may constitute a period for the respective medicament taking an effect on the patient 150.

After completion of the first time period $t_1$ the exemplifying monitoring procedure of FIG. 10 continues with the edge processing server 121 acquiring the respective trusted source data from the one or more sensor devices 151 mapped thereto and arranging the received trusted source data objects into the trusted aggregate data object, as indicated in step 611, the edge processing server 121 transmitting the trusted aggregate data object to the data processing application 171 in the cloud server 131, as indicated in step 612, and the data processing application 171 in the cloud server 131 extracting (and storing in a memory in the cloud server 131) the source data originating from the one or more sensor devices 151, as indicated in step 613. As in steps 605 and 609, the data extraction may be provided via the exemplifying verification procedure described in the foregoing with references to FIG. 5. The steps from 611 to 613 may be repeated until detecting a second change in the source data in comparison to the second reference data (defined in step 610), as indicated in step 614. The second change in the source data may be detected in response to observing a respective change that exceeds a respective change threshold in the source data originating from predefined one(s) of the one or more sensor devices 151. Herein, a time period from production of the second reference data until detecting the second change may be referred to as a second time period $t_2$. The second time period $t_2$ may be defined, for example, based on the respective source timestamps or aggregate timestamps received in the respective trusted aggregate data objects obtained at the cloud server 131 in step 609 (upon detecting the first change) and in step 614 (upon detecting the second change).

The detection of the second change in the source data involved in step 614 may further comprise or be followed by the data processing application 171 in the cloud server 131 annotating the source data received during the second time period $t_2$ accordingly. In this regard, the annotation of the source data may comprise annotating each source data item obtained during the second time period $t_2$ as one belonging to the second time period $t_2$ and/or annotating the source data received in the trusted aggregate data object that served to terminate the second time period $t_2$ as third reference data. According to an example, the second time period $t_2$ that starts upon the medicament identified by the medicament ID having taken an effect (at the end of the first time period $t_1$) and ends upon detecting the second change in the obtained source data may constitute a period during which the medicament under consideration is having an effect on the patient 150.

In consideration of the exemplifying sensor devices 151-1 to 151-5, the first and second changes described in the foregoing may pertain, for example, to the heart rate of the patient 150 indicated in the respective source data received from the sensor device 151-5: the first change in the heart rate that exceeds a respective first predefined (possibly patient specific) change threshold may be considered as an indication of the medicament under study taking an effect, whereas the subsequent second change in the heart rate that exceeds a respective second predefined (possibly patient specific) change threshold may be considered as an indication of the medicament under study no longer having an effect. In another example, the first and second changes described in the foregoing may pertain, for example, to the movement (e.g. shaking) of the arms of the patient 150 indicted in the respective source data received from the sensor devices 151-1 and 151-2: the first change in movement that exceeds a respective first predefined (possibly patient specific) change threshold may be considered as an indication of the medicament under study taking an effect, whereas the subsequent second change in movement of the arms that exceeds a respective second predefined (possibly patient specific) change threshold may be considered as an indication of the medicament under study no longer having an effect.

In a further example concerning detection of the first and second changes in the sensor data, each of the first change and the second change may consider the respective source data received from sensors of two or more different types. As an example in this regard, the heart rate of the patient 150 indicated in the respective source data received from the sensor device 151-5 may be considered in view of the movement of the arms and/or legs of the patient 150 indicated in the respective source data received from the sensor devices 151-1 to 151-4, thereby evaluating the changes in the heart rate of the patient 150 in view of the movement of the arms and/or legs of the user 150 to account for the heart rate that is characteristics of the patient 150 due to his/her current activity (e.g. lying on a bed, sitting on a chair, standing, walking, running, . . . ) or a change in his/her activity.

The first and second time periods $t_1$, $t_2$ obtained via operation of the monitoring procedure according to the example of FIG. 10 may be may be applied in planning a protocol of medication for the patient 150, whereas the sensor data received in the trusted aggregate data objects during the first and second time periods $t_1$, $t_2$ (and stored in the memory in the cloud server 131) enables more detailed analysis and tracking of the effect of the medicament under study on the source data obtained from the respective ones of the one or more sensor devices 151. Moreover, the integrity verification carried out on the received trusted aggregate data objects ensures integrity of the received source data as well as integrity of the devices involved in production of the source data.

As described in the foregoing, the source data from the one or more sensor devices 151 (of from the one or more data source apparatuses 111 in general) are provided with timestamps, i.e. respective source timestamps assigned for the source data originating from a given one of the one or more sensor devices 151 (or from a given one of the one or more data source apparatuses 111) and/or aggregate timestamps assigned for the aggregate data forwarded from the edge processing server 121, and the data processing application 171 in the cloud server 131 preferably stores each source data item in the memory therein with the associated timestamp to facilitate subsequent analysis of the source data by the data processing application 171.

Even though an aspect of operation of the data processing application 171 in the cloud server 131 is described in the foregoing with references to the exemplifying monitoring procedure according to FIG. 10, in other examples the monitoring may not involve a specific triggering event such as the medicament information of step 601 and/or identification of the first and/or second time periods $t_1$, $t_2$ but the monitoring may be carried out substantially continuously, e.g. such that the following steps are repeated according to a predefined schedule, e.g. at predefined time intervals: the edge processing server 121 acquires the respective trusted source data from the one or more sensor devices 151 mapped thereto, the edge processing server 121 arranges the received trusted source data objects into the trusted aggregate data object, the edge processing server 121 transmits the trusted aggregate data object to the data processing application 171 in the cloud server 131, and the data processing application 171 in the cloud server 131 extracts (and stores in the memory therein) the source data originating from the one or more sensor devices 151. Also in this example the data extraction may be provided via the exemplifying verification procedure described in the foregoing with references to FIG. 5. Consequently, the data processing application 171 in the cloud server 131 may analyze the source data stored in the memory therein in order track the behavioral state of the patient 150 and/or to detect unexpected changes in respective sensor data originating from one or more of the one or more sensor devices 151. In case the analysis results in detecting such an unexpected change, the data processing application 171 may issue an alert and/or provide the corresponding source data item stored in the memory in the cloud server 131 with a respective annotation. Such detection of unexpected changes in sensor values may enable detecting unexpected changes in the behavioral state of the patient 150 and/or detecting malfunction or power loss in the respective one of the one or more sensor devices 151.

A further example that pertains to monitoring of the behavioral state of the patient 150 without a specific triggering event may consider the heart rate of the patient 150 indicted in the respective source data received from the sensor device 151-5. In an example, the heart rate indicated in the source data from the sensor device 151-5 may be compared against a first range of heart rates that indicate a resting heart rate for the patient 150 and a second range of heart rates that indicate an active heart rate for the patient 150: in case the heart rate falls within the first range, the patient 150 is considered to be in a resting state, whereas a heart rate falling with the second range assigns the patient 150 into an active state. In a variation of this example, the first range may represent healthy (or normal) heart rates for the patient 150 while the second range may represent unhealthy (or abnormal) heart rates for the patient 150, and his/her state or condition may be determined accordingly based on the heart rate indicated in the source data originating from the sensor device 151-5.

Moreover, the exemplifying monitoring procedure of FIG. 10 and variations thereof (e.g. the one described in the foregoing that does not involve the specific triggering event such as the medicament information of step 601 and/or the identification of the first and/or second time periods $t_1$, $t_2$) described in the foregoing with references to acquisition of sensor data that is descriptive of the behavioral state of the patient 150 based on respective source data acquired from the one or more sensor devices 151 that are arranged to observe respective behavioral characteristics of the patient 150 readily generalize into applying the data acquisition system 100 for a monitoring procedure pertaining to any sensor data in any framework where the integrity of acquired data and the integrity of the devices involved in acquisition of the sensor data is considered important, for example into one that is applicable for monitoring of respective sensor data acquired in the IoT framework for industrial and/or commercial purposes. Non-limiting examples in this regard involve applying one or more sensor devices for monitoring respective aspects of operation of robotics applied in an assembly line of a manufacturing facility, for monitoring aspects of operation of a control system or an engine in context of a vehicle or a powerplant, for monitoring one or more environmental characteristics in a space in order to enable modeling and prediction of the respective environmental characteristics in the space in their possible effect on occupants of the space and/or on devices operated in the space. Moreover, instead of or in addition to strictly using the data acquisition procedure 100 for acquisition of sensor data using the one or more sensor devices 151, the respective source data obtained from the one or more sensor devices 151 may comprise information that characterizes at least one aspect of interaction between the patient 150 (or a subject under study in general) and the respective one of the one or more sensor devices 151.

In the foregoing, various aspects related to operation of the data acquisition system 100 are described with references to the one or more data source apparatuses 111, the edge processing server 121 and/or the cloud server 131, while these aspects of operation pertaining to elements of the data acquisition system 100 may be provided and/or described as steps of a respective method. As non-limiting examples in this regard, FIG. 11 depicts a flowchart that illustrates steps of a method 700 that may be applied to provide the functionality described in the foregoing with references to the data source apparatus 111-$k$ or the functionality described in the foregoing with references to the edge processing server 121, whereas FIG. 12 depicts a flowchart that illustrates steps of a method 800 that may be applied to provide the functionality described in the foregoing with references to the cloud server 131. Each of the methods 700, 800 may be varied in a number of ways without departing from the scope of the present disclosure, for example in accordance with the examples described in the foregoing and/or in the following.

The method 700 proceeds from acquiring, in an apparatus, data for transmission to another apparatus, as indicated in block 702. The data acquisition may be carried out in response to a request received from said another apparatus. The method 700 further comprises deriving a quote that is descriptive one or more aspects of a configuration of the apparatus upon production of said acquired data, as indicated in block 704 and arranging said acquired data and said quote as a data object for transmission to said another apparatus, as indicated in block 706. The method 700 further comprises deriving, based on said data object, a digital signature using a first key assigned to the apparatus, as indicated in block 708, and transmitting the data object and the digital signature to said another apparatus, as indicated block 710.

As an example, the method 700 may be carried out in the data source apparatus 111-$k$ and hence the data acquisition (cf. block 702) may comprise obtaining source data locally at the data source apparatus 111-$k$, for example reading sensor data from one or more sensors provided at the data source apparatus 111-$k$. The quote (cf. block 704) may comprise the data source quote (quote$_k$) described in the foregoing and, consequently, the data object (cf. block 706) may comprise the source data object (data_obj$_k$) described in the foregoing. Moreover, the first key (cf. block 708) may comprise the unique key (key$_k$) assigned to the data source apparatus 111-$k$ and, consequently, the digital signature may comprise the data source signature (sig$_k$) described in the foregoing. Furthermore, the data source apparatus 111-$k$ may transmit (cf. block 710) the source data object (data_obj$_k$) and the source data signature (sig$_k$) as trusted data to said another apparatus, which may comprise the edge processing server 121 to which the data source apparatus 111-$k$ is mapped.

As another example, the method 700 may be carried out in the edge processing server 121 and the acquired data may comprise aggregate data (data$_{edge}$). The data acquisition (cf. block 702) may comprise transmitting, to one or more data source apparatuses 111 mapped to the edge processing server 121, a respective source data request, receiving, from the one or more data source apparatuses 111, a respective trusted data source object (a combination of data_obj$_k$ and sig$_k$) and arranging the respective trusted data source objects received from the one or more source data apparatuses 111 as the aggregate data (data$_{edge}$) for provisioning to said another apparatus, which in this example may comprise the cloud server 131. The quote (cf. block 704) may comprise the edge processing server quote (quote$_{edge}$) described in the foregoing and, consequently, the data object (cf. block 706) may comprise the aggregate data object (data_obj$_{edge}$) described in the foregoing. Moreover, the first key (cf. block 708) may comprise the unique key (key$_{edge}$) assigned to the edge processing server 121 and, consequently, the digital signature may comprise the edge processing server signature (sig$_{edge}$) described in the foregoing. Furthermore, the edge processing server 121 may transmit (cf. block 710) the aggregate data object (data_obj$_{edge}$) and the edge processing server signature (sig$_{edge}$) as a trusted aggregate data object to the cloud server 131.

The method 800 may comprise transmitting, to an intermediate apparatus, a data request for reception of source data from the one or more data source apparatuses 111 mapped to the intermediate apparatus, wherein the intermediate apparatus may comprise, for example, the edge processing server 121. The method 800 comprises receiving, from the intermediate apparatus, a trusted aggregate data object comprising an aggregate data object (data_obj$_{edge}$) and an intermediate apparatus signature (sig$_{edge}$), wherein the aggregate data object (data_obj$_{edge}$) comprises aggregate data (data$_{edge}$) comprising a respective trusted source data object (a combination of data_obj$_k$ and sig$_k$) for the one or more data source apparatuses 111 and an intermediate apparatus quote (quote$_{edge}$) that is descriptive of one or more aspects of a configuration of the intermediate apparatus upon production of the aggregate data (data$_{edge}$) and wherein the intermediate apparatus signature comprises a digital signature (sig$_{edge}$) derived based on the aggregate data object (data_obj$_{edge}$) using a first key assigned to the intermediate apparatus, as indicated in block 802. Herein, the first key may comprise the unique key (key$_{edge}$) assigned to the edge processing server 121. The method 800 further comprises verifying, based at least in part on information received in the trusted aggregate data object, integrity of data included in the trusted aggregate data object and integrity of the intermediate apparatus, as indicated in block 804.

At least some of the operations, procedures and/or functions described in the foregoing with references to an element of the data acquisition system 100 may be implemented by respective hardware means, by respective software means, or by a respective combination of the hardware means and software means.

As an example in this regard, operations, procedures and/or functions described in the foregoing with references to the data source apparatus 111-$k$ or to the edge processing server 121 may be implemented by a first apparatus comprising means for acquiring data for transmission to another apparatus, wherein the means for acquiring data may be arranged to acquire the data in response to a request received from said another apparatus. The first apparatus may further comprise means for deriving a quote that is descriptive one or more aspects of a configuration of the first apparatus upon production of said acquired data, means for arranging said acquired data and said quote as a data object for transmission to said another apparatus, means for deriving, based on said data object, a digital signature using a first key assigned to the apparatus, and means for transmitting the data object and the digital signature to said another apparatus. The first apparatus may further comprise means for receiving, from said another apparatus, a request for data and to carry out the data acquisition in response to said request.

As an example, the first apparatus may comprise the data source apparatus 111-$k$, wherein the means for acquiring data may be arranged to obtain source data (data$_k$) locally at the data source apparatus 111-$k$, for example to read sensor data from one or more sensors provided at the data source apparatus 111-$k$, the means for deriving the quote may be arranged to derive the data source quote (quote$_k$) that is descriptive of one or more aspects of the data source apparatus 111-$k$ upon obtaining the source data (data$_k$), the means for arranging the acquired data and the quote for transmission to another apparatus may be configured to arrange the source data (data$_k$) and the data source quote (quote$_k$) into the source data object (data_obj$_k$) for transmission to the edge processing server 121, means for deriving the digital signature may be arranged to derive the data source signature (sig$_k$) using the unique key (key$_k$) assigned to the data source apparatus 111-$k$, and the means for transmitting may be arranged to transmit the source data object (data_obj$_k$) and the data source signature (sig$_k$) as the trusted source data object to the edge processing server 121.

As another example, the first apparatus may comprise the edge processing server 121, wherein the means for acquiring data may be arranged to obtain respective trusted source data from the one or more data source apparatuses 111 mapped thereto and wherein the means for acquiring data may be arranged to transmit, to one or more data source apparatuses 111 mapped to the edge processing server 121, a respective source data request, to receive, from the one or more data source apparatuses 111, a respective trusted data source object (a combination of data_obj$_k$ and sig$_k$) and to arrange the respective trusted data source objects received from the one or more source data apparatuses 111 as the aggregate data (data$_{edge}$). In this example, the means for deriving the quote may be arranged to derive the edge processing server quote (quote$_{edge}$) that is descriptive of one or more aspects of the edge processing server 121 upon production of the aggregate data (data$_{edge}$), the means for arranging the acquired data and the quote for transmission to another apparatus may be configured to arrange the aggregate data (data$_{edge}$) and the edge processing server quote (quote$_{edge}$) into the aggregate data object (data_obj$_{edge}$), the means for deriving the digital signature may be arranged to derive the edge processing server signature (sig$_{edge}$) using the unique key (key$_{edge}$) assigned to the edge processing server 121, and the means for transmitting may be arranged to transmit the aggregate data object (data_obj$_{edge}$) and the edge processing server signature (sig$_{edge}$) as the trusted aggregate data object to the cloud server 131.

As another example, operations, procedures and/or functions described in the foregoing with references to the cloud server 131 may be implemented by a second apparatus comprising means for receiving, from an intermediate apparatus, a trusted aggregate data object comprising an aggregate data object (data_obj$_{edge}$) and an intermediate apparatus signature (sig$_{edge}$), wherein the intermediate apparatus may comprise the edge processing server 121. Therein, the aggregate data object (data_obj$_{edge}$) comprises aggregate data comprising a respective trusted source data object (a combination of data_obj$_k$ and sig$_k$) for one or more data source apparatuses 111 mapped to the intermediate apparatus and an intermediate apparatus quote (quote$_{edge}$) that is descriptive of one or more aspects of a configuration of the intermediate apparatus upon production of the aggregate data (data$_{edge}$) and wherein the intermediate apparatus signature comprises a digital signature (sig$_{edge}$) derived based on the aggregate data object (data_obj$_{edge}$) using a first key assigned to the intermediate apparatus, wherein the first key may comprise the unique key (key$_{edge}$) assigned to the edge processing server 121. The second apparatus further comprises means for verifying, based at least in part on information received in the trusted aggregate data object, integrity of data included in the trusted aggregate data object and integrity of the intermediate apparatus. The second apparatus may further comprise means for transmitting, to the intermediate apparatus, a data request for reception of the source data from the one or more data source apparatuses 111 mapped to the intermediate apparatus.

Figure 13:
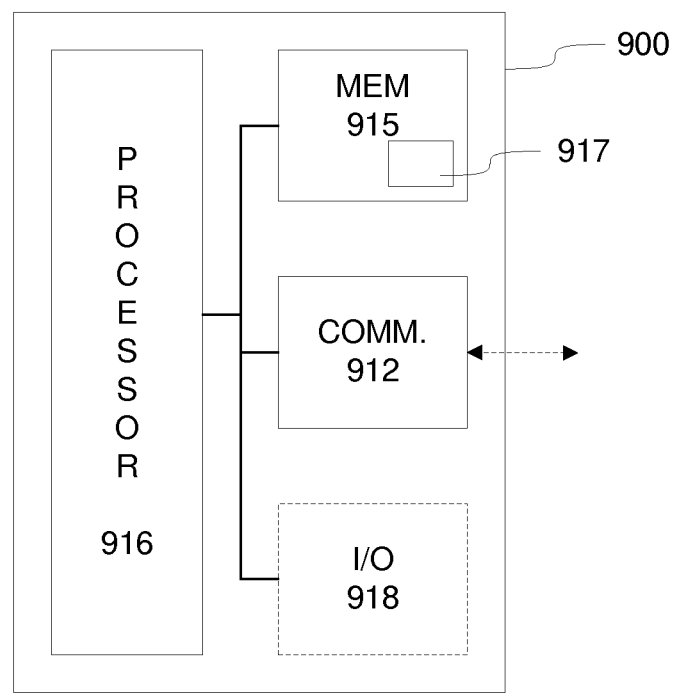
FIG. 13 illustrates a block diagram of some elements of an apparatus according to an example.

As another example for implementing at least some of the operations, procedures and/or functions described in the foregoing, FIG. 13 illustrates a block diagram of some components of an exemplifying apparatus 900 that may be employed e.g. in implementing any of the data source apparatus 111-$k$, the edge processing server 121 or the cloud server 131. The apparatus 900 may comprise further components, elements or portions that are not depicted in FIG. 13.

The apparatus 900 comprises a processor 916 and a memory 915 for storing data and computer program code 917. The memory 915 and a portion of the computer program code 917 stored therein may be further arranged to, with the processor 916, to implement at least some of the operations, procedures and/or functions described in the foregoing in context of respective one of the data source apparatus 111-$k$, the edge processing server 121 or the cloud server 131.

The apparatus 900 comprises a communication portion 912 for communication with other devices. The communication portion 912 comprises at least one communication apparatus that enables wired or wireless communication with other apparatuses. A communication apparatus of the communication portion 912 may also be referred to as a respective communication means.

The apparatus 900 may further comprise user I/O (input/output) components 918 that may be arranged, possibly together with the processor 916 and a portion of the computer program code 917, to provide a user interface for receiving input from a user of the apparatus 900 and/or providing output to the user of the apparatus 900 to control at least some aspects of operation of the respective one of the data source apparatus 111-$k$, the edge processing server 121 or the cloud server 131. The user I/O components 918 may comprise hardware components such as a display, a touchscreen, a touchpad, a mouse, a keyboard, and/or an arrangement of one or more keys or buttons, etc. The user I/O components 918 may be also referred to as peripherals. The processor 916 may be arranged to control operation of the apparatus 900 e.g. in accordance with a portion of the computer program code 917 and possibly further in accordance with the user input received via the user I/O components 918 and/or in accordance with information received via the communication portion 912.

Although the processor 916 is depicted as a single component, it may be implemented as one or more separate processing components. Similarly, although the memory 915 is depicted as a single component, it may be implemented as one or more separate components, some or all of which may be integrated/removable and/or may provide permanent/semi-permanent/dynamic/cached storage.

The computer program code 917 stored in the memory 915, may comprise computer-executable instructions that control one or more aspects of operation of the apparatus 900 when loaded into the processor 916. As an example, the computer-executable instructions may be provided as one or more sequences of one or more instructions.

The processor 916 is able to load and execute the computer program code 917 by reading the one or more sequences of one or more instructions included therein from the memory 915. The one or more sequences of one or more instructions may be configured to, when executed by the processor 916, cause the apparatus 700 to carry out at least some of the operations, procedures and/or functions described in the foregoing in context of respective one of the data source apparatus 111-$k$, the edge processing server 121 or the cloud server 131.

Hence, the apparatus 900 may comprise at least one processor 916 and at least one memory 915 including the computer program code 917 for one or more programs, the at least one memory 915 and the computer program code 917 configured to, with the at least one processor 916, cause the apparatus 900 to perform at least some of the operations, procedures and/or functions described in the foregoing in context of respective one of the data source apparatus 111-$k$, the edge processing server 121 or the cloud server 131.

The computer programs stored in the memory 915 may be provided e.g. as a respective computer program product comprising at least one computer-readable non-transitory medium having the computer program code 917 stored thereon, the computer program code, when executed by the apparatus 900, causes the apparatus 900 at least to perform at least some of the operations, procedures and/or functions described in the foregoing in context of respective one of the data source apparatus 111-$k$, the edge processing server 121 or the cloud server 131. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although functions have been described with reference to certain features, those functions may be performable by other features whether described or not. Although features have been described with reference to certain embodiments, those features may also be present in other embodiments whether described or not.

The invention claimed is:

1. An apparatus comprising at least one processor; and at least one memory storing instructions that, when executed by the at least one processor, cause the apparatus at least to perform:
   receive, from an intermediate apparatus, a trusted aggregate data object comprising
      an aggregate data object that comprises aggregate data comprising a respective trusted source data object for one or more data source apparatuses mapped to the intermediate apparatus and an intermediate apparatus quote that is descriptive of one or more aspects of a configuration of the intermediate apparatus upon production of the aggregate data, and
      an intermediate apparatus signature comprising a digital signature derived based on the aggregate data object using a first key assigned to the intermediate apparatus;
   verify, based at least in part on information received in the trusted aggregate data object, integrity of data included in the trusted aggregate data object and integrity of the intermediate apparatus by causing a key request to be transmitted to a first attestation server; and
   discard, responsive to denial of the key request, the data included in the trusted aggregate data object.

2. An apparatus according to claim 1, wherein said first key assigned to the intermediate apparatus comprises a private key of a public key cryptography scheme.

3. An apparatus according to claim 1, wherein the data source quote comprises a measurement result that is descriptive of one or more aspects of software, hardware and/or firmware applied in the intermediate apparatus upon production of the aggregate data.

4. An apparatus according to claim 1, wherein said verification comprising verifying integrity of the aggregate data object, further comprises:
   receiving, from the first attestation server that is arranged to monitor trustworthiness of the intermediate apparatus, a second key assigned to the intermediate apparatus;
   applying said second key to the aggregate data object to derive a verification signature; and
   verifying the integrity of the aggregate data object using the intermediate apparatus signature received in the trusted aggregate data object and the verification signature.

5. An apparatus according to claim 4, wherein said second key assigned to the intermediate apparatus comprises a public key of a public key cryptography scheme applied in deriving the intermediate device signature.

6. An apparatus according to claim 4, wherein said verification comprising verifying integrity of the intermediate apparatus, further comprises:
   transmitting a quote verification request to the first attestation server, the quote verification request comprising the intermediate apparatus quote;
   receiving a verification result from the first attestation server; and
   determining integrity of the intermediate apparatus based on the verification result.

7. An apparatus according to claim 1,
wherein the aggregate data comprises a respective trusted source data object for the one or more data source apparatuses, wherein each source data object comprises:
a respective source data object that comprises source data received for the respective data source apparatus and a data source quote that is descriptive of one or more aspects of a configuration of the respective data source apparatus upon production of the source data, and
a respective data source signature that comprises a digital signature derived based on the respective source data object using a first key assigned to the respective data source apparatus; and
wherein execution of said computer program code using said at least one processor causes the apparatus to verify, based at least in part on the aggregate data, integrity of the source data received for the respective data source apparatus and integrity of the respective data source apparatus.

8. An apparatus according to claim 7, wherein said first key assigned to the respective data source apparatus comprises a respective private key of a public key cryptography scheme.

9. An apparatus according to claim 7, wherein the respective data source quote comprises a measurement result that is descriptive of one or more aspects of software, hardware and/or firmware applied in the respective data source apparatus upon production of the respective source data.

10. An apparatus according to claim 7, wherein said verification comprises verifying integrity of the respective source data object received for at least one of the one or more data source apparatuses, comprising:
transmitting, to a second attestation server that is arranged to monitor trustworthiness of the one or more data source apparatuses, a key request pertaining to the respective data source apparatus;
receiving, from the second attestation server, a second key assigned to the respective data source apparatus;
applying the second key assigned to the respective data source apparatus to the source data object received for the respective data source apparatus to derive a respective verification signature; and
verifying the integrity of the respective source data object received for the given data source apparatus using the respective data source signature received in the trusted aggregate data object and the respective verification signature derived for the respective data source apparatus.

11. An apparatus according to claim 10, wherein said second key comprises a public key of a public key cryptography scheme applied in deriving the respective data source signature for the respective source data object.

12. An apparatus according to claim 10, wherein said verification comprises verifying integrity of at least one of the one or more data source apparatuses, comprising:
transmitting, to the second attestation server, a quote verification request pertaining to the respective data source apparatus, wherein the quote verification request comprises the respective data source quote;
receiving a respective verification result from the second attestation server; and
determining integrity of the respective data source apparatus based on the respective verification result.

13. An apparatus according to claim 1, wherein execution of said computer program code using said at least one processor causes the apparatus to transmit, to the intermediate apparatus, a data request for reception of said source data from said one or more data source apparatuses mapped to the intermediate apparatus.

14. A method comprising:
receiving, from an intermediate apparatus, a trusted aggregate data object comprising
an aggregate data object that comprises aggregate data comprising a respective trusted source data object for one or more data source apparatuses mapped to the intermediate apparatus and an intermediate apparatus quote that is descriptive of one or more aspects of a configuration of the intermediate apparatus upon production of the aggregate data, and
an intermediate apparatus signature comprising a digital signature derived based on the aggregate data object using a first key assigned to the intermediate apparatus;
verifying, based at least in part on information received in the trusted aggregate data object, integrity of data included in the trusted aggregate data object and integrity of the intermediate apparatus by causing a key request to be transmitted to a first attestation server; and
discard, responsive to denial of the key request, the data included in the trusted aggregate data object.

15. A method according to claim 14, wherein said first key assigned to the intermediate apparatus comprises a private key of a public key cryptography scheme.

16. A method according to claim 14, wherein the data source quote comprises a measurement result that is descriptive of one or more aspects of software, hardware and/or firmware applied in the intermediate apparatus upon production of the aggregate data.

17. A method according to claim 14, wherein said verification comprising verifying integrity of the aggregate data object, further comprises:
receiving, from the first attestation server that is arranged to monitor trustworthiness of the intermediate apparatus, a second key assigned to the intermediate apparatus;
applying said second key to the aggregate data object to derive a verification signature; and
verifying the integrity of the aggregate data object using the intermediate apparatus signature received in the trusted aggregate data object and the verification signature.

18. A method according to claim 17, wherein said second key assigned to the intermediate apparatus comprises a public key of a public key cryptography scheme applied in deriving the intermediate device signature.

19. A method according to claim 17, wherein said verification comprises verifying integrity of the intermediate apparatus, comprising:
transmitting a quote verification request to the first attestation server, the quote verification request comprising the intermediate apparatus quote;
receiving a verification result from the first attestation server; and
determining integrity of the intermediate apparatus based on the verification result.

20. A non-transitory computer readable medium comprising program instructions that, when executed by an apparatus, cause the apparatus to perform at least the following:
receive, from an intermediate apparatus, a trusted aggregate data object comprising
an aggregate data object that comprises aggregate data comprising a respective trusted source data object for one or more data source apparatuses mapped to the intermediate apparatus and an intermediate apparatus quote that is descriptive of one or more aspects of a configuration of the intermediate apparatus upon production of the aggregate data, and an intermediate apparatus signature comprising a digital signature derived based on the aggregate data object using a first key assigned to the intermediate apparatus;

verify, based at least in part on information received in the trusted aggregate data object, integrity of data included in the trusted aggregate data object and integrity of the intermediate apparatus by causing a key request to be transmitted to a first attestation server; and discard, responsive to denial of the key request, the data included in the trusted aggregate data object.

* * * * *